(12) United States Patent
Kim et al.

(10) Patent No.: US 11,847,986 B2
(45) Date of Patent: *Dec. 19, 2023

(54) BACKLIGHT APPARATUS FOR DISPLAY

(71) Applicants: Global Technologies Co., Ltd., Hwaseong-si (KR); Min Seon Kim, Hwaseong-si (KR); Yong Geun Kim, Hwaseong-si (KR)

(72) Inventors: Min Seon Kim, Hwaseong-si (KR); Yong Geun Kim, Suwon-si (KR)

(73) Assignee: GLOBAL TECHNOLOGIES CO., LTD., Hwaseong-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,178

(22) Filed: Jun. 22, 2021

(65) Prior Publication Data

US 2021/0398499 A1  Dec. 23, 2021

(30) Foreign Application Priority Data

Jun. 22, 2020 (KR) .................. 10-2020-0076047

(51) Int. Cl.
*G09G 3/34* (2006.01)
*G09G 3/36* (2006.01)
(Continued)

(52) U.S. Cl.
CPC ......... *G09G 3/3426* (2013.01); *G09G 3/2011* (2013.01); *G09G 3/2022* (2013.01);
(Continued)

(58) Field of Classification Search
CPC .. G09G 3/3426; G09G 3/2011; G09G 3/2022; G09G 3/32; G09G 2300/0804;
(Continued)

(56) References Cited

U.S. PATENT DOCUMENTS 10,201,049 B1\*  2/2019  Xie .................... H05B 45/48
10,555,389 B2\*  2/2020  Xie .................. H05B 45/3725
(Continued)

FOREIGN PATENT DOCUMENTS

CN  106373516  2/2017
CN  109686320  4/2019
(Continued)

*Primary Examiner* — Michael J Jansen, II
(74) *Attorney, Agent, or Firm* — KILE PARK REED & HOUTTEMAN PLLC

(57) ABSTRACT

The present disclosure discloses a backlight apparatus for a display and a current control integrated circuit thereof. The backlight apparatus includes a backlight panel including light-emitting diode (LED) channels having a matrix structure and divided into a plurality of control units, a column driver configured to provide, in a horizontal period unit, column signals corresponding to columns of the LED channels, a row driver configured to provide, in a frame unit, row signals corresponding to rows of the LED channels and to sequentially provide the row signals in the horizontal period included in the frame, and current control integrated circuits disposed in the backlight panel in a way to correspond to the control units, respectively, and each configured to receive the column signal and the row signals corresponding to LED channels of the control unit and to control emission of the LED channels of the control unit.

31 Claims, 13 Drawing Sheets

(51) Int. Cl.
  *G09G 3/32* (2016.01)
  *G09G 3/20* (2006.01)

(52) U.S. Cl.
  CPC ............... *G09G 3/32* (2013.01); *G09G 3/36* (2013.01); *G09G 2300/0804* (2013.01); *G09G 2300/0819* (2013.01); *G09G 2310/0294* (2013.01); *G09G 2320/0233* (2013.01); *G09G 2320/0247* (2013.01); *G09G 2320/0626* (2013.01); *G09G 2320/0633* (2013.01); *G09G 2320/0673* (2013.01)

(58) Field of Classification Search
  CPC ... G09G 2300/0819; G09G 2320/0233; G09G 2320/0247; G09G 2320/0626; G09G 2320/0633
  See application file for complete search history.

(56) References Cited

U.S. PATENT DOCUMENTS

| | | | | |
|---|---|---|---|---|
| 10,650,737 | B2* | 5/2020 | Vahid Far | G09G 3/2014 |
| 10,818,241 | B2* | 10/2020 | Kim | H10K 59/129 |
| 10,847,077 | B2* | 11/2020 | Sakariya | G09G 3/2014 |
| 11,043,188 | B2* | 6/2021 | Zhai | G09G 3/3291 |
| 11,557,259 | B2* | 1/2023 | Kim | G09G 3/32 |
| 2007/0291198 | A1* | 12/2007 | Shen | G09G 3/3413 349/69 |
| 2014/0111559 | A1* | 4/2014 | Yang | G09G 3/2088 345/690 |
| 2017/0193958 | A1* | 7/2017 | Wang | G09G 3/3696 |
| 2018/0182279 | A1* | 6/2018 | Sakariya | G09G 3/2014 |
| 2018/0247586 | A1* | 8/2018 | Vahid Far | G09G 3/2014 |
| 2019/0045591 | A1* | 2/2019 | Xie | H05B 45/48 |
| 2019/0132915 | A1* | 5/2019 | Xie | G09G 3/342 |
| 2019/0206330 | A1 | 7/2019 | Kim et al. | |
| 2021/0065655 | A1* | 3/2021 | Zhai | G09G 5/10 |
| 2021/0398498 | A1* | 12/2021 | Kim | G09G 5/10 |

FOREIGN PATENT DOCUMENTS

| | | |
|---|---|---|
| KR | 10-2008-0078277 | 8/2008 |
| KR | 10-2011-0077106 | 7/2011 |
| KR | 10-2011-0114075 | 10/2011 |
| KR | 10-2017-0064887 | 6/2017 |
| KR | 10-2020-0046516 | 5/2020 |
| TW | 201911282 | 3/2019 |
| WO | 2010/004871 | 1/2010 |

* cited by examiner

| | C11<br>D1 | C12<br>D2 | C13<br>D3 | C14<br>D4 |
|---|---|---|---|---|
| G1 | 4 | 5 | 1 | 2 |
| G2 | 3 | 1 | 5 | 5 |
| G3 | 1 | 5 | 2 | 3 |
| G4 | 5 | 3 | 0 | 2 |
| G5 | 2 | 5 | 0 | 4 |
| G6 | 4 | 1 | 1 | 5 |
| G7 | 1 | 0 | 3 | 0 |
| G8 | 5 | 3 | 0 | 2 |
| G9 | 3 | 2 | 5 | 1 |

BACKLIGHT APPARATUS FOR DISPLAY

CROSS-REFERENCE TO RELATED APPLICATION(S)

This application claims priority to and benefits of Korean Patent Application No. 10-2020-0076047 under 35 U.S.C. § 119, filed on Jun. 22, 2020 in the Korean Intellectual Property Office, the entire contents of which are incorporated herein by reference.

BACKGROUND

1. Technical Field

The present disclosure relates to a backlight apparatus for a display, and more particularly, to a backlight apparatus for a display including current control integrated circuits configured for each control unit with respect to light-emitting diode (LED) channels.

2. Related Art

Among display panels, for example, an LCD panel requires a backlight apparatus for the display of a screen.

The backlight apparatus provides light for the display of a screen from the back of the LCD panel. The LCD panel may display a screen by using the light of the backlight apparatus by performing an optical shutter operation for each pixel.

The backlight apparatus may be designed to include LED channels each using LEDs as light sources. The LED channels include a plurality of LEDs that are connected in series.

The emission of the LED channels is controlled by column signals and row signals for implementing resolution different from resolution of the pixels of the LCD panel.

It is difficult for an LED channel of a conventional common backlight apparatus for performing dimming control to maintain emission for one frame. If the time taken to maintain the emission of the LED channel is not sufficient, flicker may occur. Therefore, the backlight apparatus needs to adopt a design for reducing or preventing flicker.

Furthermore, the backlight apparatus needs to control the LED channels to emit light with uniform brightness and to be designed to detect an electrical short or electrical opening of an LED channel.

Furthermore, the backlight apparatus needs to be designed to perform active dimming control by adjusting a brightness range of all the LED channels or a brightness range of each LED channel.

The backlight apparatus is required to implement a multi-function in order to provide the LCD panel with the amount of light having good quality, and to be developed to secure high reliability by providing the multi-function.

SUMMARY

Various embodiments are directed to providing a backlight apparatus for a display, which can reduce or prevent flicker and control a driving current of an LED channel in order to provide an LCD panel with light for the display of a screen, and a current control integrated circuit thereof.

Furthermore, various embodiments are directed to providing a backlight apparatus for a display in which brightness by the emission of an LED channel can be maintained for one frame in response to a column signal, and a current control integrated circuit thereof.

Various embodiments are directed to providing a backlight apparatus for a display in which a given number of LED channels continuously disposed in the same column of a backlight panel can be divided into control units and driving currents can be controlled for each control unit, and a current control integrated circuit thereof.

Various embodiments are directed to providing a backlight apparatus for a display, which can control an LED channel to emit light having uniform brightness and detect an electrical short or electrical opening of an LED channel, and a current control integrated circuit thereof.

Various embodiments are directed to providing a backlight apparatus for a display, which can perform active dimming control capable of adjusting a brightness range of all LED channels or a brightness range for each LED channel, and a current control integrated circuit thereof.

Various embodiments are directed to providing a backlight apparatus for a display, which can provide an LCD panel with the amount of light having good quality through a multi-function and can secure high reliability by providing the multi-function, and a current control integrated circuit thereof.

In an embodiment, a backlight apparatus for a display may include a backlight panel including light-emitting diode (LED) channels having a matrix structure and divided into a plurality of control units, a column driver configured to provide, in a horizontal period unit, column signals corresponding to columns of the LED channels, a row driver configured to sequentially provide, in a frame unit, row signals corresponding to rows of the LED channels, and current control integrated circuits disposed in the backlight panel in a way to correspond to the control units, respectively, and each configured to receive the column signal and the row signals corresponding to LED channels of the control unit and to control emission of the LED channels of the control unit. Each of the current control integrated circuits generates sampling voltages by sequentially sampling the column signal for each horizontal period by using the row signals and controls the emission of LED channels of each control unit and the maintenance of brightness of the LED channels by using the sampling voltages.

In an embodiment, a current control integrated circuit of a backlight apparatus may include a column input stage to which a column signal corresponding to a given number of light-emitting diode (LED) channels defined as a control unit is input in a horizontal period unit, row input stages to which row signals corresponding to the LED channels of the control unit are input in a frame unit, driving current controllers configured to receive a column signal in common and connected to the row input stages, respectively, and control stages connected to the driving current controllers, respectively. Each of the driving current controllers generates a sampling voltage by sampling the column signal by using the row signal and controls a driving current of the LED channel connected to the control stage by using the sampling voltage.

In an embodiment, a backlight apparatus for a display may include a backlight panel including light-emitting diode (LED) channels having a matrix structure forming a frame and divided into a plurality of control units, a column driver configured to distributively provide a column signal for each of subframes time-divided from one frame period with respect to each of the LED channels and to provide the column signals to columns of the frame in a horizontal period unit of the subframe, wherein the column signal is generated to have brightness determined by the number of subframes, the subframes being included in the one frame period and turned on, a row driver configured to provide row signals to rows of the frame for each subframe and to sequentially provide the row signals in the horizontal period for each subframe, and current control integrated circuits disposed in the backlight panel in a way to correspond to the control units, respectively, and each configured to receive the column signal and the row signals corresponding to the LED channels of the control unit and to control emission of the LED channels of the control unit. Each of the current control integrated circuits generates sampling voltages by sequentially sampling the column signal provided in the horizontal period unit by using the row signals for each subframe and controls the emission of LED channels of each control unit and the maintenance of brightness of the LED channels by using the sampling voltages.

In an embodiment, a backlight apparatus for a display may include a backlight panel including light-emitting diode (LED) channels having a matrix structure forming a frame and divided into a plurality of control units, a column driver configured to distributively provide a column signal for each of subframes time-divided from one frame period with respect to each of the LED channels and to provide the column signals to columns of the frame in a horizontal period unit of the subframe, wherein brightness ranges represented by the column signal are divided into a first brightness range and a second brightness range, the column signal having the first brightness range is generated to have brightness determined by the number of subframes, the subframes being included in the one frame period and turned on, and the column signal having the second brightness range is generated to represent brightness depending on amplitude, a row driver configured to provide row signals to rows of the frame for each subframe and to sequentially provide the row signals in the horizontal period for each subframe, and current control integrated circuits disposed in the backlight panel in a way to correspond to the control units, respectively, and each configured to receive the column signal and the row signals corresponding to the LED channels of the control unit and to control emission of the LED channels of the control unit. Each of the current control integrated circuits generates sampling voltages by sequentially sampling the column signal provided in the horizontal period unit by using the row signals for each subframe and controls the emission of LED channels of each control unit and the maintenance of brightness of the LED channels by using the sampling voltages.

According to the present disclosure, a driving current of an LED channel can be controlled to maintain emission based on a sampling voltage obtained by sampling a column signal. That is, the brightness of the LED channel can be maintained for one frame, and the flicker in the backlight apparatus for a display can be reduced or prevented.

Furthermore, according to the present disclosure, a given number of LED channels continuously disposed in the same column of a backlight panel are divided into a plurality of control units. The current control integrated circuit is configured for each control unit. Therefore, driving currents of the LED channels can be controlled for each control unit. Convenience of a design and fabrication for control of the driving currents of the LED channels in the backlight panel can be guaranteed.

Furthermore, according to the present disclosure, the LED channels can be controlled to emit light with uniform brightness, and an electrical short or electrical opening of an LED channel can be periodically detected.

Furthermore, according to the present disclosure, a brightness range of all LED channels can be adjusted or a brightness range can be adjusted for each LED channel. Therefore, the backlight apparatus for a display which can perform active dimming control and a current control integrated circuit thereof can be provided.

Furthermore, according to the present disclosure, the amount of light having good quality can be provided to the LCD panel through the multi-function. Therefore, there is an advantage in that high reliability can be secured.

DETAILED DESCRIPTION

Hereinafter, embodiments of the present disclosure are described in detail with reference to the accompanying drawings. Terms used in the present specification and claims should not be limitedly construed as common or dictionary meanings, but should be construed as having meanings and concepts that comply with the technical matters of the present disclosure.

Elements illustrated in embodiments and drawings described in this specification are embodiments of the present disclosure and do not represent all the technical spirit of the present disclosure. Accordingly, various equivalents and modification examples which may substitute the elements may be present at the time of filing this application.

Figure 1:
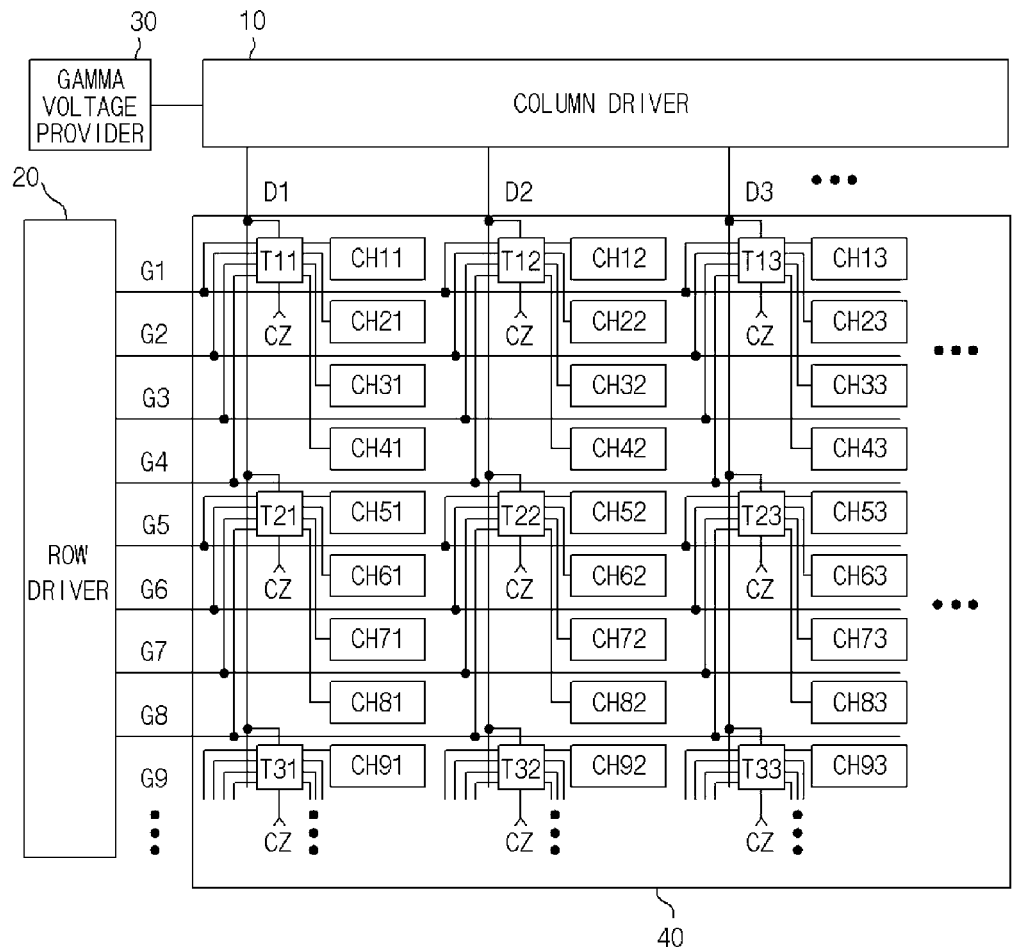
FIG. 1 is a block diagram illustrating a preferred embodiment of a backlight apparatus for a display according to the present disclosure.

A backlight apparatus according to an embodiment of the present disclosure includes a column driver 10, a row driver 20 and a backlight panel 40 as illustrated in FIG. 1, and may further include a gamma voltage provider 30 for providing the column driver 10 with a gamma voltage for representing brightness.

A display device is equipped with a display panel (not illustrated). For example, a display panel such as an LCD panel includes a backlight apparatus of FIG. 1, at the back thereof.

The display panel is configured to perform an optical shutter operation for each pixel and to display a screen on the front thereof by using light of the backlight apparatus provided from the back thereof.

The backlight apparatus serves to provide the display panel with light for the display of a screen, and includes the backlight panel 40 for emission.

The backlight panel 40 includes, as light sources, LED channels that provide light in a direct type in order to act as surface light sources.

The backlight panel 40 of FIG. 1 according to an embodiment includes the LED channels using LEDs as light sources. The LED channels may be disposed as a matrix structure having columns and rows in the backlight panel 40. Each of the LED channels may be understood to include a plurality of LEDs connected in series.

According to an embodiment of the present disclosure, the LED channels are divided into a plurality of control units. The control unit may be defined to include a given number of LED channels continuously disposed on the same column.

FIG. 1 illustrates that LED channels CH11 to CH93 are disposed in the backlight panel 40.

In an embodiment, four LED channels continuously disposed on the same column are divided as a basic control unit. That is, each of the LED channels CH11, CH21, CH31, and CH41, the LED channels CH51, CH61, CH71, and CH81, the LED channels CH12, CH22, CH32, and CH42, the LED channels CH52, CH62, CH72, and CH82, the LED channels CH13, CH23, CH33, and CH43, and the LED channels CH53, CH63, CH73, and CH83 are divided as one control unit.

Furthermore, an embodiment of the present disclosure includes current control integrated circuits corresponding to the control units, respectively.

In FIG. 1, current control integrated circuits T11, T12, T13, T21, T22, T23, T31, T32, and T33 are configured to correspond to the respective control units of the backlight panel 40. More specifically, the current control integrated circuit T11 is configured to control driving currents of the LED channels CH11, CH21, CH31, and CH41. The current control integrated circuit T21 is configured to control driving currents of the LED channels CH51, CH61, CH71, and CH81. The current control integrated circuit T12 is configured to control driving currents of the LED channels CH12, CH22, CH32, and CH42. The current control integrated circuit T22 is configured to control driving currents of the LED channels CH52, CH62, CH72, and CH82. The current control integrated circuit T13 is configured to control driving currents of the LED channels CH13, CH23, CH33, and CH43. The current control integrated circuit T23 is configured to control driving currents of the LED channels CH53, CH63, CH73, and CH83.

The current control integrated circuits T11, T12, T13, T21, T22, T23, T31, T32, and T33 are configured to receive column signals from the column driver 10 and to receive row signals from the row driver 20.

The backlight panel 40 has brightness controlled based on data corresponding to one frame. The data corresponding to one frame includes data corresponding to a plurality of horizontal periods.

The column driver 10 is configured to provide column signals corresponding to data in each horizontal period. For example, the column driver 10 provides column signals D1, D2, D3, . . . corresponding to the columns of LED channels in a horizontal period unit. Signal lines to which the column signals D1, D2, D3, . . . are applied may be named column lines.

Data provided to the column driver 10 has a value for representing brightness. The column driver 10 provides the column signals D1, D2, D3, . . . , each one having a level corresponding to data, by using gamma voltages.

The gamma voltages may be provided by the gamma voltage provider 30. The column driver 10 may provide the column signals D1, D2, D3, . . . by selecting gamma voltages corresponding to data.

The row driver 20 is configured to provide row signals G1, G2, . . . G9 corresponding to rows of LED channels in a frame unit. The row signals G1, G2, . . . G9 each have a preset pulse width and are sequentially provided in a horizontal period. Signal lines to which the row signals G1, G2, . . . G9 are applied may be named row lines.

Each of the current control integrated circuits T11, T12, T13, T21, T22, T23, T31, T32, and T33 receives a column signal and row signals of a corresponding control unit.

To this end, the current control integrated circuits T11, T21, and T31 share one column line in order to receive the column signal D1. The current control integrated circuits T12, T22, and T32 share one column line in order to receive the column signal D2. The current control integrated circuits T13, T23, and T33 share one column line in order to receive the column signal D3.

Furthermore, each of the current control integrated circuits T11, T12, T13, T21, T22, T23, T31, T32, and T33 receives row signals of a corresponding control unit. The current control integrated circuits T11, T12, and T13; T21, T22, and T23; T31, T32, and T33, each one at the same row location, receive the same row signals, and share row lines.

Each of the current control integrated circuits T11, T12, T13, T21, T22, T23, T31, T32, and T33 receives a column signal and row signals of a corresponding control unit, as described above, and controls the emission of each control unit by controlling driving currents of LED channels of each control unit. For example, as described above, the current control integrated circuit T11 receives the column signal D1, receives the row signals G1 to G4, and controls driving currents of the LED channels CH11, CH21, CH31, and CH41.

The current control integrated circuits T11, T12, T13, T21, T22, T23, T31, T32, and T33 may generate sampling voltages by sequentially sampling column signals for each horizontal period by using row signals, and each may control the emission of LED channels of each control unit and the maintenance of brightness of the LED channels based on the sampling voltages. For example, the current control integrated circuit T11 generates a sampling voltage by sampling the column signal D1 for each horizontal period by using the row signals G1 to G4 for each horizontal period that are sequentially provided, and controls driving currents for the emission of the LED channels CH11, CH21, CH31, and CH41 that belong to the same control unit based on the sampling voltages.

Furthermore, each of the current control integrated circuits T11, T12, T13, T21, T22, T23, T31, T32, and T33 may receive a zoom control signal CZ for controlling a driving current. The zoom control signal CZ is described later with reference to FIGS. 12 and 13.

Figure 2:
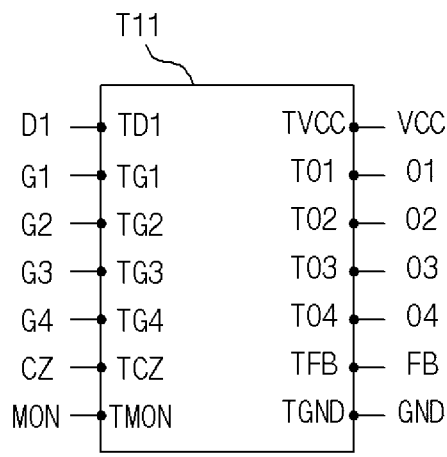
FIG. 2 is a block diagram illustrating a current control integrated circuit of FIG. 1.

Each of the current control integrated circuits T11, T12, T13, T21, T22, T23, T31, T32, and T33 configured as in FIG. 1 may be illustrated in detail as in FIG. 2. FIG. 2 illustrates the current control integrated circuit T11.

The current control integrated circuit T11 includes a column input stage TD1 to which the column signal D1 is input, row input stages TG1 to TG4 to which the row signals G1 to G4 are input, respectively, a zoom input stage TCZ to which the zoom control signal CZ is input, a monitor stage TMON to which a monitor signal MON is input, a ground stage TGND connected to a ground GND, an operation voltage stage TVCC to which an operation voltage VCC is applied, a feedback stage TFB to which a feedback signal FB is input, and control stages T01 to T04 to which driving currents 01 to 04 of the LED channels CH11, CH21, CH31, and CH41 are input, respectively.

The aforementioned current control integrated circuits T11, T12, T13, T21, T22, T23, T31, T32, and T33 need to be configured to improve optical efficiency because they are applied to the backlight panel 40. To this end, it is preferred that some of or all the current control integrated circuits T11, T12, T13, T21, T22, T23, T31, T32, and T33 are each packaged to have a white outer surface, not a bright outer surface.

Figure 3:
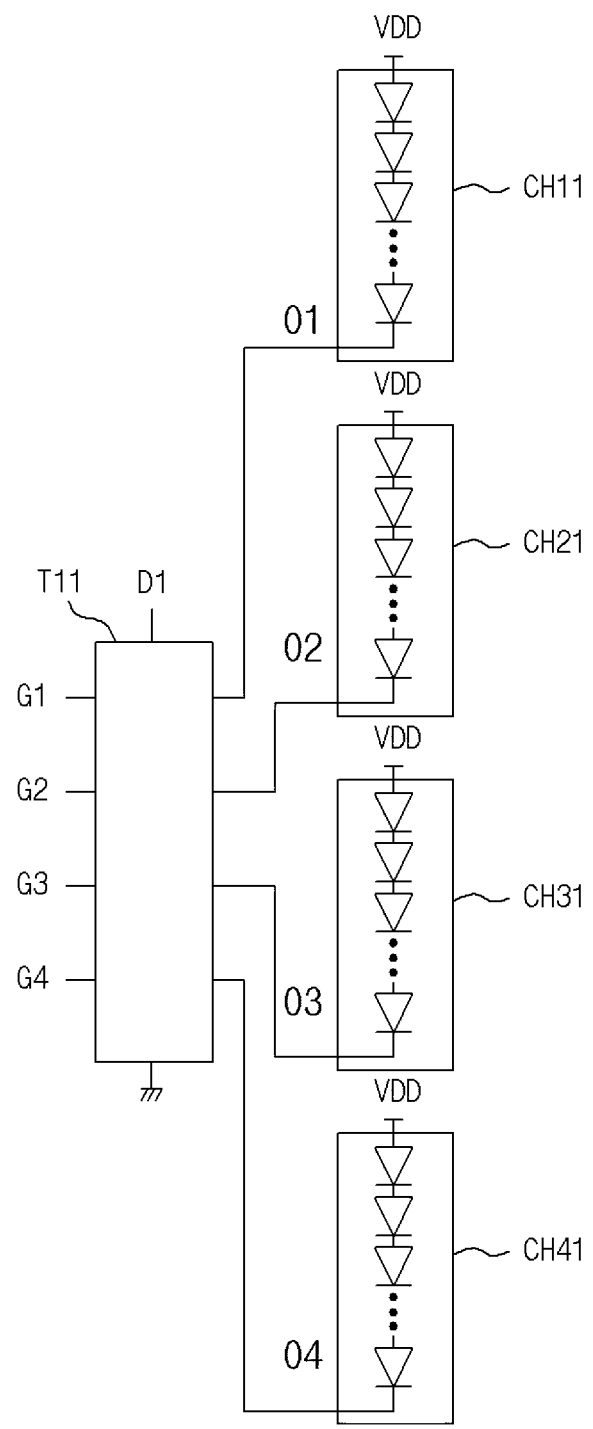
FIG. 3 is a block diagram illustrating an electrical connection relation between the current control integrated circuit and LED channels.

An electrical connection between the current control integrated circuit T11 and the LED channels CH11, CH21, CH31, and CH41 corresponding to a control unit in FIG. 2 may be understood with reference to FIG. 3.

Each of the LED channels CH11, CH21, CH31, and CH41 includes a plurality of LEDs to which an emission voltage VDD is applied and that are connected in series. The driving currents 01 to 04 on the low side of the LED channels CH11, CH21, CH31, and CH41 are input to the current control integrated circuit T11.

The constructions of the remaining current control integrated circuits T12, T13, T21, T22, T23, T31, T32, and T33 may be understood with reference to FIGS. 2 and 3.

Figures 4, 5:
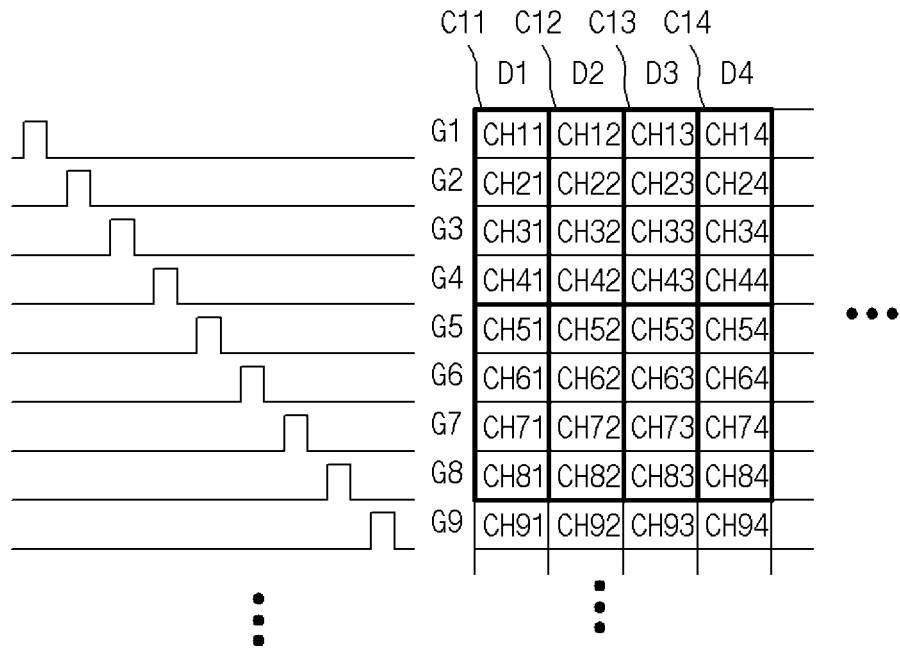
FIG. 4 is a diagram illustrating the arrangement of LED channels and the classification of control units for LED channels.
FIG. 5 is a diagram illustrating brightness of column signals applied to LED channels.

FIG. 4 illustrates the arrangement of LED channels and the classification of control units for the LED channels. FIG. 4 illustrates a control unit C11 including the LED channels CH11, CH21, CH31, and CH41, a control unit C12 including the LED channels CH12, CH22, CH32, and CH42, a control unit C13 including the LED channels CH13, CH23, CH33, CH43, and a control unit C14 including the LED channels CH14, CH24, CH34, and CH44, for example.

One column signal and four row signals correspond to each control unit.

Furthermore, for emission, column signals applied to the LED channels may be provided to have levels for brightness illustrated in FIG. 5. More specifically, FIG. 5 illustrates that column signals D1, D2, D3, and D4 are provided to have levels "4, 5, 1, 2", respectively, in a first horizontal period in which the row signal G1 is provided and are provided to have levels "3, 1, 5, 5", respectively, in a second horizontal period in which the row signal G2 is provided. In this case, the level may be understood as amplitude of the column signal. Furthermore, values of the column signals are illustrated as being represented between eight levels divided into a range of 0 and 7. Values of the column signals may be represented as various levels depending on resolution for representing brightness, and may be represented as resolution, such as sixteen levels, thirty-second levels or sixty-four levels, for example.

An embodiment of the present disclosure may be operated by column signals and row signals provided as in FIGS. 4 and 5. The sampling of the column signal by the row signals according to an embodiment of the present disclosure may be understood with reference to FIG. 6.

Figure 6:
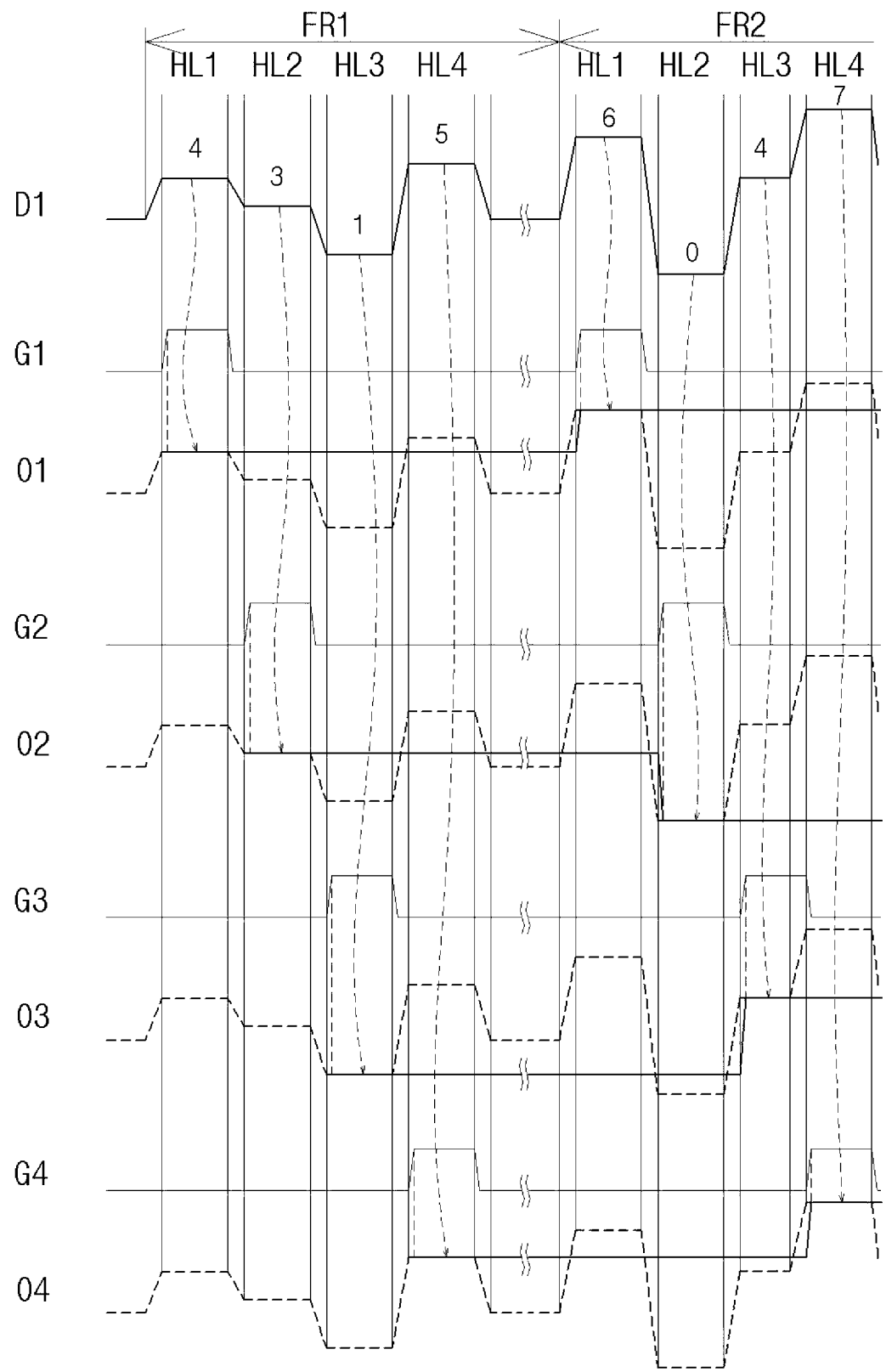
FIG. 6 is a waveform diagram for describing an operation of the current control integrated circuit according to a pulse amplitude modulation (PAM) method.

In FIG. 6, each of FR1 and FR2 indicates a frame period. Each of HL1 to HL4 indicates a horizontal period. D1 indicates a column signal. Each of G1 to G4 indicates a row signal. Furthermore, "4, 3, 1, 5" of the column signal D1 indicate levels, that is, amplitude, of the column signal indicated in FIG. 5.

In this case, in an embodiment of the present disclosure, a driving current is controlled by a level, that is, amplitude, of a column signal, that is, a pulse. This may be understood that the driving current is controlled by pulse amplitude modulation (PAM).

FIG. 6 is a waveform diagram for describing an operation of the current control integrated circuit according to the PAM method.

Referring to FIG. 6, in the horizontal period HL1 of the frame FR1, the column signal D1 is provided to the current control integrated circuit T11 as the level "4", and the row signal G1 is provided to the current control integrated circuit T11 as a level (e.g., "high") for sampling. In this case, the current control integrated circuit T11 generates a sampling voltage by sampling the column signal having the level "4" by using the row signal G1, and controls the driving current 01, having the level "4" corresponding to a level of the sampling voltage, to flow for emission. The sampling voltage of the current control integrated circuit T11 is maintained up to the horizontal period HL1 of the next frame FR2. Therefore, the current control integrated circuit T11 maintains the level of the driving current 01 of the LED channel CH11 up to the horizontal period HL1 of the next frame FR2 in order to maintain brightness having the level "4."

The levels of the column signal D1 are changed into the levels "3", "1", and "5" in accordance with horizontal periods HL2, HL3, and HL4, respectively, which sequentially proceed to the horizontal period HL1. The current control integrated circuit T11 generates sampling voltages by sampling the column signal D1 by using the row signals G2, G3, and G4 sequentially provided for each horizontal period, and controls the driving currents 02, 03, and 04 corresponding to levels of the sampling voltages, respectively, to flow for emission. The sampling voltage generated by the current control integrated circuit T11 by using each of the row signals G2, G3, and G4 is maintained up to the horizontal periods HL2, HL3, and HL4 of the next frame FR2. Therefore, the current control integrated circuit T11 maintains the levels of the driving currents 02, 03, and 04 of the LED channel CH11 in order to maintain, up to a next frame FR3, brightness having a level corresponding to a level of the column signal D1 in each horizontal period.

Furthermore, the sampling voltage is maintained for one frame period as described above, and may be understood as being reset to have a level corresponding to a level of a current column signal in a frame period unit.

That is, the current control integrated circuit T11 generates the sampling voltages for the LED channels CH11, CH21, CH31, and CH41, respectively, in response to the column signal D1 and the row signals G1 to G4, and controls a driving current between the control stages T01 to T04 and the ground GND, corresponding to the low side of each of the LED channels CH11, CH21, CH31, and CH41, by using the sampling voltages.

Figure 7:
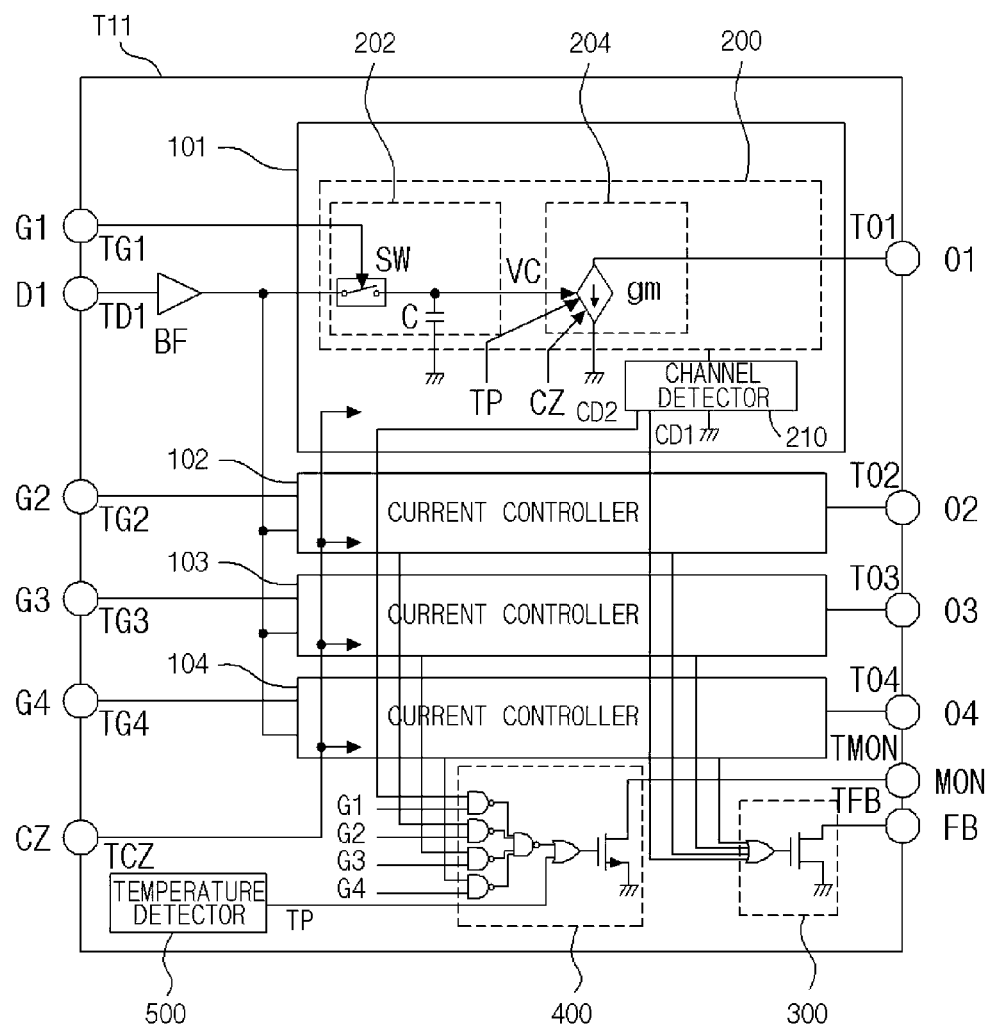
FIG. 7 is a detailed block diagram illustrating an example of the current control integrated circuit.

For the aforementioned operation, the current control integrated circuit T11 may be implemented as in FIG. 7.

Referring to FIG. 7, the current control integrated circuit T11 is configured to include a buffer BF, driving current controllers 101 to 104, a feedback signal provider 300, a monitor signal provider 400, and a temperature detector 500.

The buffer BF is configured to receive the column signal D1 through the column input stage TD1 and to provide the received column signal D1 to the driving current controllers 101 to 104 in common. As in FIG. 8, the buffer BF may be designed to be mounted within each of the driving current controllers 101 to 104. The current control integrated circuit T11 of FIG. 7 includes the same elements as the current control integrated circuit T11 of FIG. 8 except the construction of the buffer BF. Therefore, a construction and operation of the current control integrated circuit illustrated in FIG. 8 may be understood with reference to FIG. 7, and detailed descriptions thereof are omitted.

Each of the driving current controllers 101 to 104 is configured to generate a sampling voltage VC by sampling the column signal D1 by using each of the row signals G1 to G4 of a corresponding LED channel and to control each of the driving current 01 to 04 of the LED channels CH11, CH21, CH31, and CH41 connected to the control stages T01 to T04, respectively, by using the sampling voltage VC.

Constructions and operations of the driving current controllers 101 to 104 are described by representatively referring to the driving current controller 101. Each of the driving current controllers 102 to 104 may be understood to have the same construction as the driving current controller 101.

First, the driving current controller 101 is configured to receive the column signal D1, the row signal G1, a temperature detection signal TP, and the zoom control signal CZ and to control the driving current 01.

The driving current controller 101 includes an internal circuit 200 and a channel detector 210.

Figure 8:
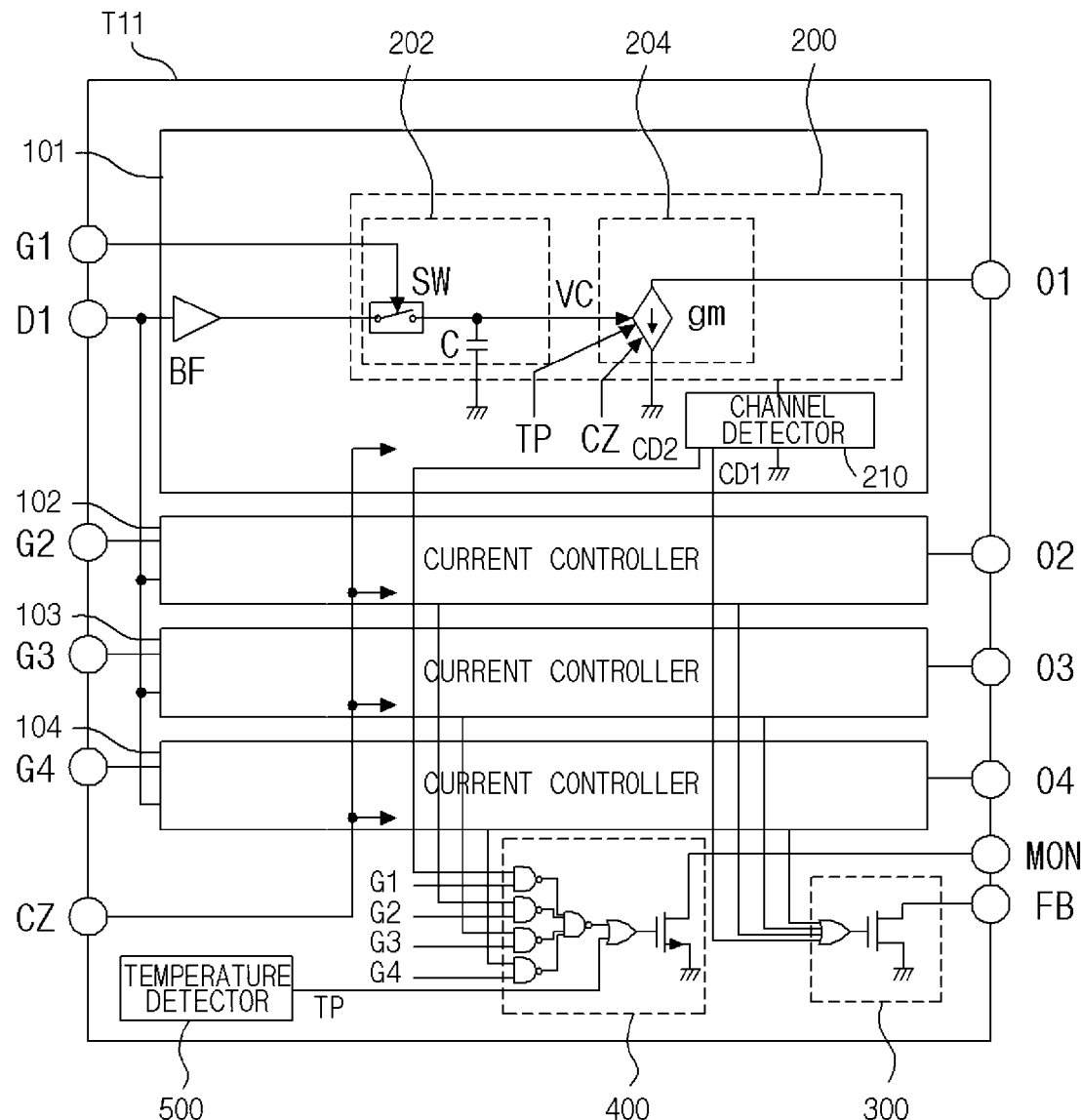
FIG. 8 is a detailed block diagram illustrating another example of the current control integrated circuit.

In the case of FIGS. 7 and 8, the internal circuit 200 includes a holding circuit 202 and a channel current controller 204.

The holding circuit 202 is configured to generate the sampling voltage VC by sampling the column signal D1 by using the row signal G1 and to maintain the sampling voltage VC. To this end, the holding circuit 202 includes a switch SW for switching the transfer of the column signal D in response to the row signal G1 and a capacitor C for generating the sampling voltage VC by sampling the column signal D1 transferred through the switch SW. The capacitor C performs sampling for charging the column signal D1, transferred through the switch SW, while the row signal G1 is enabled, and stores and generates the sampling voltage VC corresponding to a result of the sampling. Furthermore, the capacitor C may provide the sampling voltage VC to the channel current controller 204 while maintaining the sampling voltage VC.

The channel current controller 204 is configured to control the amount of the driving current 01 for the emission of the LED channel CH11, connected to the control stage T01, by using the sampling voltage VC of the capacitor C. The channel current controller 204 may be configured to have a follower current source "gm" for controlling a flow of the driving current 01 so that the driving current 01 has an amount corresponding to a level of the sampling voltage VC. Furthermore, the follower current source "gm" may receive the temperature detection signal TP and the zoom control signal CZ, and may be configured to block a flow of the driving current in response to the temperature detection signal TP or to allow a driving current, amplified based on a level of the zoom control signal CZ, to flow.

The channel detector 210 may be configured to detect a voltage between the control stage T01 and the ground GND and to provide a first detection signal CD1 and a second detection signal CD2.

In this case, the first detection signal CD1 is a result of determining whether the level of the voltage between the control stage T01 and the ground GND is equal to or lower than a first level or less. The second detection signal CD2 is a result of determining whether the level of the voltage between the control stage T01 and the ground GND is equal to or lower than a second level lower than the first level. The first detection signal CD1 and the second detection signal CD2 may be provided to have high levels when the above conditions are satisfied.

The driving current 01 may be decreased when the emission voltage VDD applied to the LED channel CH11 is lower than a minimum emission voltage. Therefore, when the emission voltage VDD is regulated, the driving current 01 is also regulated. As a result, brightness of the LED channel CH11 may be regularly maintained. The first detection signal CD1 serves to regulate the driving current 01. When the level of the voltage between the control stage T01 and the ground GND becomes equal to or lower than a preset level, for example, 0.3 V, the first detection signal CD1 may be activated to a high level and the first detection signal having a high level may be provided. The first detection signal CD1 may be provided to the feedback signal provider 300.

If an electrical short or an electrical opening occurs in the LED channel CH11, the driving current 01 may be blocked or may abnormally flow a lot. In this case, when the level of the voltage between the control stage T01 and the ground GND becomes equal to or lower than a preset level, for example, 0.2 V, which is lower than the first level, the second detection signal CD2 may be activated to a high level and the second detection signal CD2 having a high level may be provided. The second detection signal CD2 may be provided to the monitor signal provider 400.

The feedback signal provider 300 is configured to control the feedback signal FB by controlling a current between the feedback stage TFP and the ground GND in response to the first detection signals CD1 of the respective driving current controllers 101 to 104.

To this end, the feedback signal provider 300 may include an OR gate and a current driving transistor. The OR gate serves to control the gate of the current driving transistor in response to at least one of the first detection signals CD1 of the driving current controllers 101 to 104. The current driving transistor may control the level of the feedback signal FB in a low level in response to high level output of the OR gate, and may control the level of the feedback signal FB in a high level in response to low level output of the OR gate.

That is, when the level of at least one of the driving current controllers 101 to 104 becomes lower than a preset level, the feedback signal provider 300 may control the level of the feedback signal FB in a low level. Control of the emission voltage according to the feedback signal FB is described later with reference to FIG. 10.

Furthermore, the temperature detector 500 is configured to provide the temperature detection signal TP obtained by sensing a temperature of the current control integrated circuit T11 configured as a chip. For example, when a temperature of the current control integrated circuit T11 rises to a preset temperature or higher, the temperature detector 500 may provide the temperature detection signal TP activated to a high level.

If the temperature detector 500 detects that a temperature of the current control integrated circuit T11 is a preset temperature or higher and thus the temperature detection signal TP is activated, a current flow of the follower current source "gm" is blocked by the activated temperature detection signal TP. On the contrary, if the temperature detector 500 detects that a temperature of the current control integrated circuit T11 is less than the preset temperature and thus the temperature detection signal TP is deactivated, a current flow of the follower current source "gm" is not influenced by the temperature detection signal TP. The temperature detector 500 serves to protect the integrated circuit and the backlight apparatus against overheating by controlling a driving current to flow or not to flow into an LED channel.

Furthermore, the monitor signal provider 400 is configured to receive the second detection signals CD2 and the row signals G1 to G4 of the driving current controllers 101 to 104 and to control the monitor signal MON by controlling a current between the monitor stage TMON and the ground GND when the row signal of at least one driving current controller 104 and the second detection signal CD2 are activated to a high level.

Furthermore, the monitor signal provider 400 is configured to control the monitor signal MON by controlling a current between the monitor stage TMON and the ground GND in response to the temperature detection signal TP.

To this end, the monitor signal provider 400 may include an OR gate circuit and a current driving transistor. In this case, when of the row signal of at least one driving current controller and the second detection signal CD2 are activated to a high level or the temperature detection signal TP is activated to a high level, the OR gate circuit may be configured to turn on the current driving transistor. To this end, the OR gate circuit may include first NAND gates for comparing the row signal of each of the driving current controllers and the second detection signal CD2, a second NAND gate for comparing outputs of the first NAND gates, and an OR gate for performing an OR combination on the output of the second NAND gate and the temperature detection signal TP. The OR gate circuit may be variously implemented by fabricators, and thus a detailed description and operation of the drawing are omitted. Furthermore, the current driving transistor may be configured using an NMOS transistor.

According to the above construction, if the second detection signal CD2 for the driving current controllers 101 to 104 is activated to a high level when at least one of the row signals G1 to G4 of the driving current controllers 101 to 104 is enabled to a high level, the monitor signal provider 400 may control the level of the monitor signal MON in a low level by turning on the current driving transistor. Furthermore, when the temperature detection signal TP is activated to a high level, the monitor signal provider 400 may control the level of the monitor signal MON in a low level by turning on the current driving transistor.

The monitor signal MON may be used to control an abnormal operation of the backlight apparatus by being provided to a timing controller (not illustrated) or a separate application.

Figure 9:
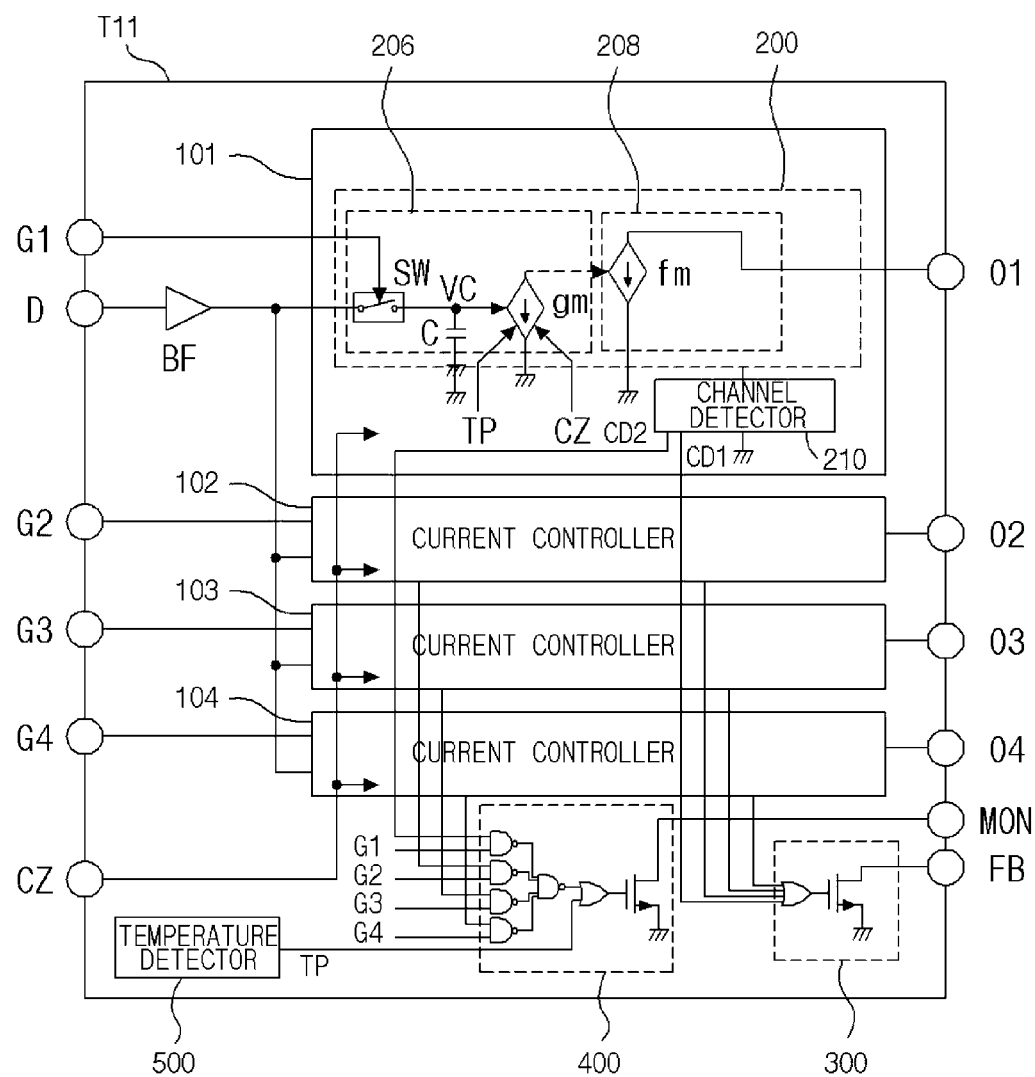
FIG. 9 is a detailed block diagram illustrating still another example of the current control integrated circuit.

The current control integrated circuit T11 may be implemented as in FIG. 9.

The current control integrated circuit T11 of FIG. 9 includes the same elements as the current control integrated circuit T11 of FIG. 7 except the internal circuit 200 included in each of the driving current controllers 101 to 104. Therefore, descriptions of constructions and operations of the same elements are omitted.

In FIG. 9, the internal circuit 200 of the current control integrated circuit T11 includes a conversion circuit 206 and a channel current controller 208.

The conversion circuit 206 is configured to generate the sampling voltage VC by sampling the column signal D1 by using the row signal G1, maintain the sampling voltage VC, and provide a control current proportional to the sampling voltage VC. To this end, the conversion circuit 206 is configured to include a switch SW for switching the transfer of the column signal D1 in response to the row signal G1, a capacitor C for generating the sampling voltage VC by sampling the column signal D1 received through the switch SW, and a follower current source "gm" for providing a control current proportional to the sampling voltage VC. The capacitor C performs sampling for charging the column signal D1 received through the switch SW while the row signal G1 is enabled, and stores and generates the sampling voltage VC corresponding to a result of the sampling. Furthermore, the capacitor C may provide the sampling voltage VC to the follower current source "gm" while maintaining the sampling voltage.

The channel current controller 208 has a construction for controlling the driving current 01 of the LED channel CH11 connected to the control stage T01 so that the driving current 01 has the amount of current proportional to a control current of the follower current source "gm." To this end, the channel current controller 208 may be configured to include a follower current source "fm" for providing a flow of the driving current 01 proportional to the control current of the follower current source "gm."

Furthermore, the follower current source "gm" may receive the zoom control signal CZ, and may control the driving current 01 that is amplified based on a level of the zoom control signal CZ and that flows into the follower current source "fm." Furthermore, the follower current source "gm" may receive the temperature detection signal TP. When the high-level temperature detection signal TP is applied, a current is blocked from flowing into the follower current source "fm". As a result, the driving current 01 may be blocked from flowing into the follower current source "fm".

Figure 10:
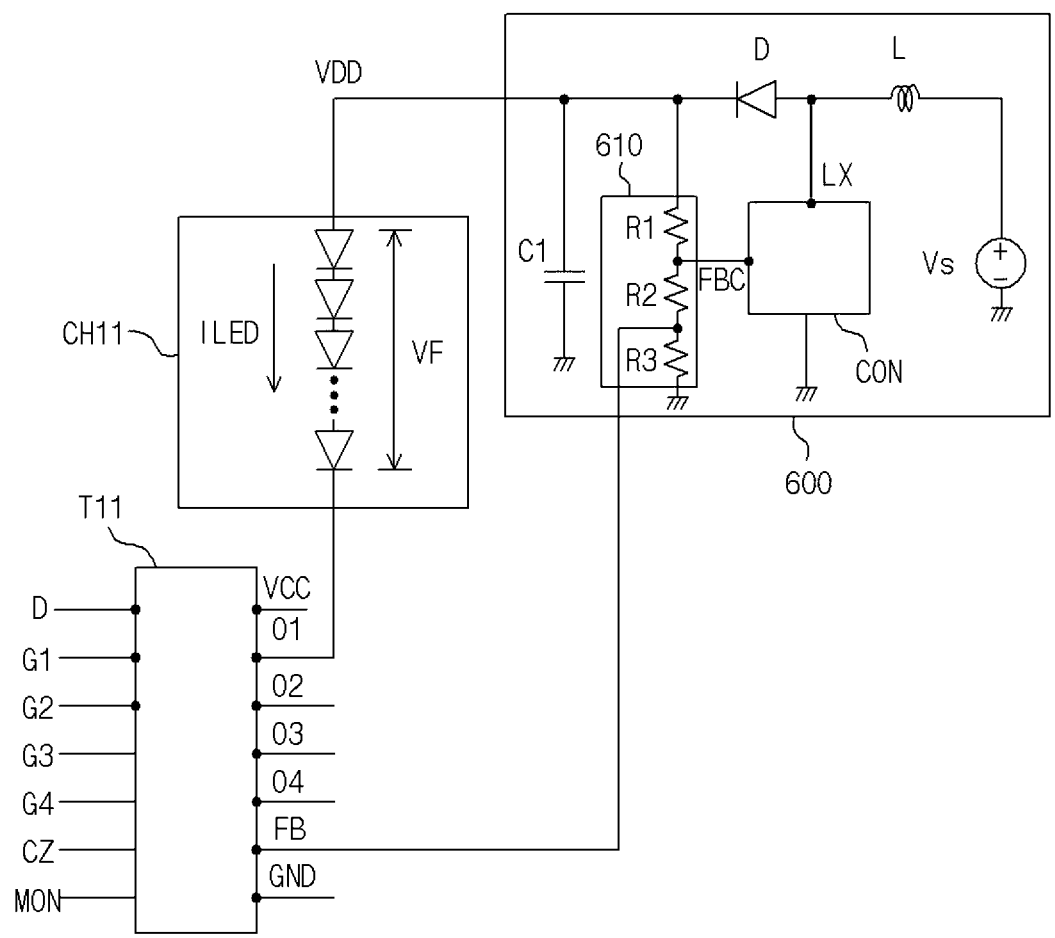
FIG. 10 is a circuit diagram illustrating a power supply circuit that performs regulation according to feedback.

FIG. 10 is a circuit diagram illustrating a power supply circuit 600 for performing regulation according to feedback. The emission voltage VSS and driving current of an LED channel may be controlled by regulation according to feedback of the power supply circuit 600.

Referring to FIG. 10, the current control integrated circuit T11 is configured to control the driving current 01 of the LED channel CH11. The power supply circuit 600 is configured to receive the feedback signal FB from the current control integrated circuit T11 and to provide the emission voltage VDD to the LED channel CH11.

The power supply circuit 600 is configured to provide the emission voltage VDD even to the LED channels CH21, CH31, and CH41 included in the same control unit C11 as the LED channel CH11. Accordingly, the regulation of the emission voltage VDD for the LED channels CH11, CH21, CH31, and CH41 may be understood from the description of the current control integrated circuit T11.

The power supply circuit 600 includes a static voltage source Vs, a detection circuit 610, a converter CON, a diode D and inductor L for boosting, and a capacitor C1 for the smoothing of the emission voltage VDD.

Among them, the static voltage source Vs may be understood as a DC voltage source for providing a static voltage.

Furthermore, the detection circuit 610 includes resistors R1, R2, and R3 connected in series, and serves to provide the converter CON with a corresponding feedback signal FBC of the emission voltage VDD in response to the feedback signal FB of the current control integrated circuit T11.

The converter CON provides the emission voltage VDD by boosting a static voltage of the static voltage source Vs, and controls the level of the emission voltage VDD in response to the feedback signal FBC provided through the detection circuit 610 so that the emission voltage VDD maintains a preset level or higher. The converter CON may be configured for the purpose of raising or lowering the static voltage of the static voltage source Vs in order to provide the emission voltage VDD by using an AC-DC converter or a DC-DC converter, for example.

The resistors R1, R2, and R3 of the detection circuit 610 which are connected in series are configured between the output stage of the emission voltage VDD and the ground. The resistor R1 is configured on the output stage of the emission voltage VDD, and the resistor R3 is configured to be connected to the ground. The feedback signal FB of the current control integrated circuit T11 is applied to a node between the resistors R2 and R3 based on an open drain output characteristic. The converter CON is configured to receive the feedback signal FBC through the node between the resistors R1 and R2.

For example, if the driving current controller 101 connected to the LED channel CH11 does not supply a driving current having a level corresponding to the level of the column signal D due to a low emission voltage VDD, a voltage between the control stage T01 and the ground GND becomes 0.3 V or less, for example, and the level of the feedback signal FB of the current control integrated circuit T11 shifts to a low level.

When the level of the feedback signal FB of the current control integrated circuit T11 shifts to a low level as described above, in the feedback signal FBC of the converter CON, a voltage division ratio for the node between the resistors R1 and R2 is decreased.

When the level of the feedback signal FB is a high impedance level, the feedback signal FBC may be approximately defined as $$\frac{R2 + R3}{R1 + R2 + R3} \times VDD.$$

Furthermore, when the level of the feedback signal FB is a low impedance level, the feedback signal FBC may be defined as $$\frac{R2}{R1 + R2} \times VDD.$$

When the feedback signal FBC is decreased, the converter CON performs a boosting operation for raising the emission voltage VDD by using a switching driving terminal LX. That is, the converter CON performs the boosting operation using the diode D and the inductor L.

Through the boosting operation of the converter CON, the emission voltage VDD may be raised, smoothed and provided to the LED channel CH11 through the capacitor C1.

The operation of raising the emission voltage VDD by the converter CON may be maintained until a voltage between the control stage T01 of the driving current controller 101 and the ground GND becomes 0.6 V or higher, for example.

The driving current controller 101 of the current control integrated circuit T11 provides the first detection signal CD1 having a low level when the voltage between the control stage T01 and the ground GND becomes 0.6 V or higher, for example, by the operation of boosting the emission voltage VDD. At this time, the level of the feedback signal FB of the current control integrated circuit T11 shifts to a high impedance level.

When the level of the feedback signal FB of the current control integrated circuit T11 shifts to the high impedance level, the voltage division ratio for the node between the resistors R1 and R2 is increased, and the level of the feedback signal FBC of the converter CON rises. At this time, the converter CON stops the operation of raising the level of the emission voltage VDD.

The converter CON may selectively perform the boosting operation in response to a change in the level of the feedback signal FB. Accordingly, the level of the emission voltage VDD may be regulated to maintain a level corresponding to a change in the level of the feedback signal FB. The LED channel CH11 may also emit light having constant brightness based on the driving current maintained to a constant level.

Figure 11:
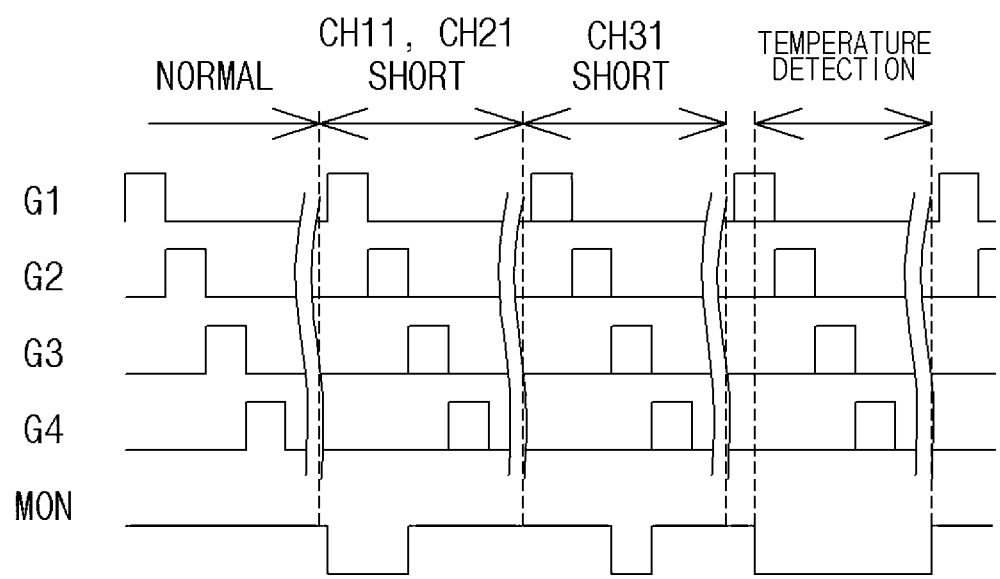
FIG. 11 is a waveform diagram for describing monitoring.

Furthermore, FIG. 11 is a waveform diagram for describing the monitoring of the monitor signal provider 400.

The monitor signal provider 400 may be used to compare the second detection signal CD2 and a corresponding row signal with respect to each LED channel and to determine an electrical short or electrical opening of the corresponding LED channel. When the LED channel is shorted or opened and the row signal is enabled, as described above, the monitor signal provider 400 controls the level of the monitor signal MON in a low level in response to the second detection signal CD2 having a high level. At this time, the low level of the monitor signal MON may be maintained for a horizontal period in which the row signal is enabled.

For example, if an electrical short or an electrical opening does not occur in LED channels, the monitor signal MON maintains a high impedance level normally as in the first frame period of FIG. 11.

In contrast, if the LED channels CH11 and CH21 are shorted, the monitor signal MON maintains a low level for two horizontal periods in which the row signals G1 and G2 for the LED channels CH11 and CH21 are enabled as in the second frame period of FIG. 11.

Furthermore, if only the LED channel CH31 is shorted, the monitor signal MON maintains a low level for one horizontal period in which the row signal G3 for the LED channel CH31 is enabled as in the third frame period of FIG. 11.

When a temperature of the current control integrated circuit T11 rises to a preset temperature or higher, the temperature detector 500 provides the temperature detection signal TP having a high level. In response thereto, the monitor signal provider 400 controls the level of the monitor signal MON in a low level, while the temperature detection signal TP maintains a high level as in the fourth frame period of FIG. 11.

The zoom control signal CZ serves to control resolution of a driving current of an LED channel controlled by the sampling voltage VC. When resolution of the driving current is increased by the zoom control signal CZ, it may be understood that resolution of brightness which may be represented by the driving current is increased.

Figure 12:
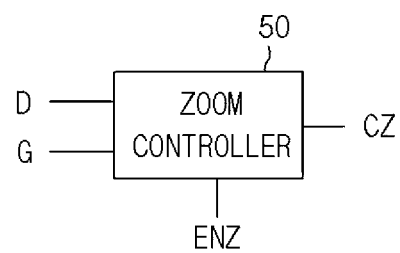
FIG. 12 is a block diagram illustrating a zoom control circuit.

Control of the driving current based on the zoom control signal CZ is described with reference to FIGS. 12 and 13.

The zoom control signal CZ may be provided by an external zoom controller 50. The zoom controller 50 may be configured using a timing controller or may be provided as a separate application chip.

The enabling of the zoom controller 50 may be controlled by a zoom enable signal ENZ. The zoom enable signal ENZ may be provided from the outside, such as a timing controller.

The zoom controller 50 operates when the zoom enable signal ENZ is enabled, may store brightness information corresponding to one frame or one horizontal period of the backlight panel 40 in response to a column signal D provided to the column driver 10, and may sequentially provide zoom control signals CZ in a row unit that is now displayed in response to a row signal G. In FIG. 12, the row signal G is a signal representative of the row signals G1 to G9 sequentially provided with respect to one frame of FIG. 1.

The zoom control signal CZ may be provided as the same value with respect to all the LED channels of the backlight panel 40 or the LED channels of the control unit. In this case, the zoom controller 50 may determine, as stored brightness information, representative brightness for each frame or the control unit of each frame, and may provide the zoom control signal CZ corresponding to a result of the determination.

Furthermore, the zoom control signal CZ may be provided for each LED channel in a way to have data for emission, that is, a value corresponding to the column signal for each LED channel. In this case, the zoom controller 50 may provide, as stored brightness information, the zoom control signal CZ corresponding to each LED channel.

Furthermore, brightness ranges represented by the column signal may be divided into a high current zone in which brightness is higher than given reference brightness and a low current zone in which brightness is lower than the given reference brightness. The zoom control signal may be provided as different values with respect to the high current zone and the low current zone.

That is, the zoom control signal CZ may be provided to have a value for controlling the driving current so that the low current zone has higher resolution than the high current zone.

Control of the driving current by the zoom control signal CZ may be described with reference to FIG. 13. FIG. 13 is a graph briefly illustrating a relation between the driving current and the column signal D in order to describe control of the driving current by the zoom control signal. In this case, the column signal D may be understood as a voltage component. In FIG. 13, the driving current is represented as ILED, and the column signal is represented as D.

Figure 13:
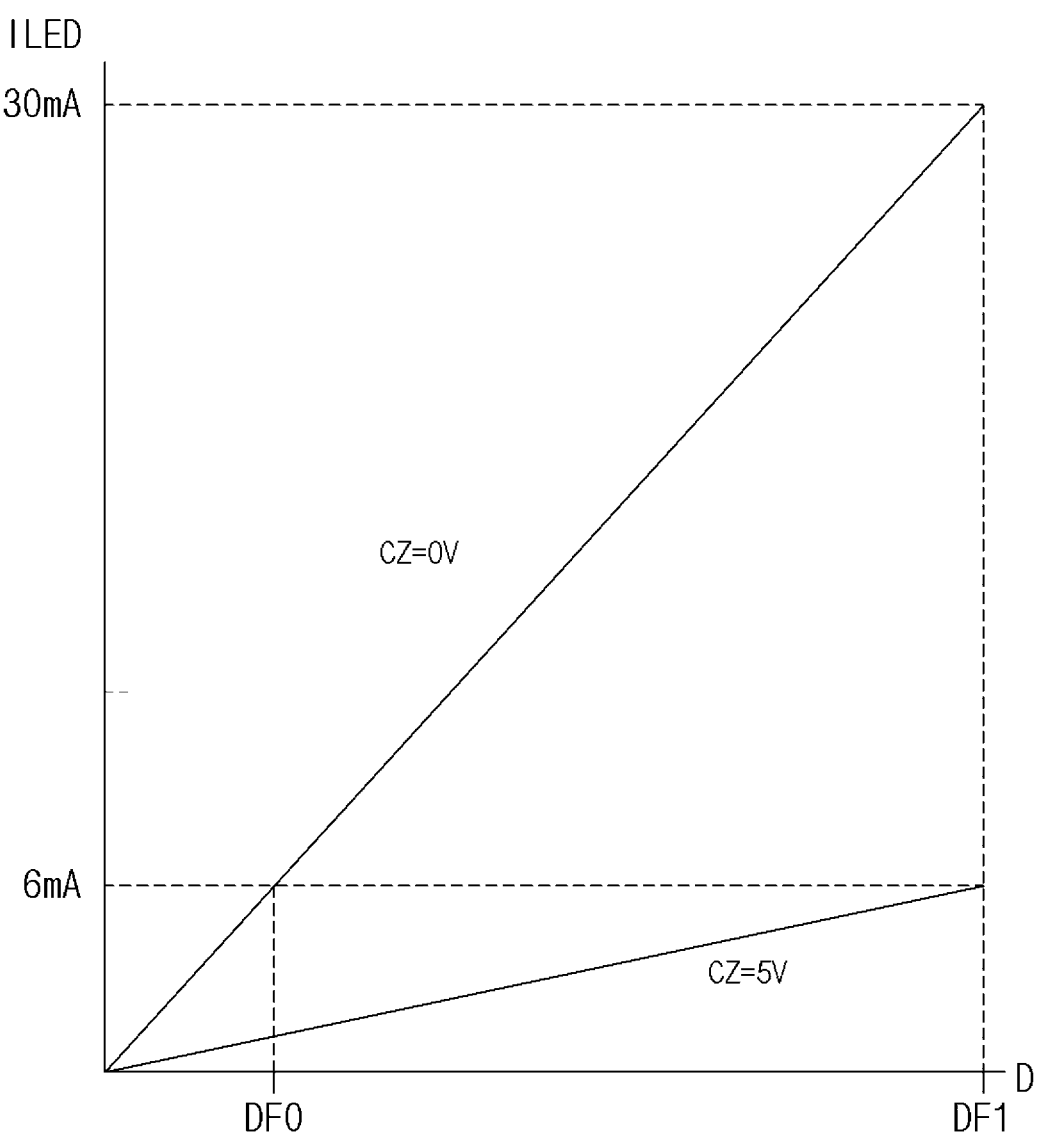
FIG. 13 is a graph describing control by a zoom control signal.

For example, as in FIG. 13, the zoom control signal CZ having 0 V may be provided with respect to the driving current whose brightness level is high, that is, 6 mA or higher, and the zoom control signal CZ having 5 V may be provided with respect to the driving current whose brightness level is low, that is, less than 6 mA. When the zoom control signal CZ having 0 V is provided, the driving current may be controlled to a range of 0 mA to 30 mA in response to the column signal D having a range of 0 V to a voltage DF1. Furthermore, when the zoom control signal CZ having 5 V is provided, the driving current whose brightness level is low, that is, less than 6 mA may be more finely controlled up to 0 mA to 6 mA in the range of 0 V to the voltage DF1, which is greater than the original brightness voltage range of 0 V to a voltage DF0. That is, when the zoom control signal CZ having 5 V is provided, the amount of the driving current having low brightness may be more finely controlled to have high resolution.

As described above, the zoom control signal CZ may be provided to have a value for controlling a driving current, corresponding to a current zone having a brightness level equal to or greater than a given reference, to have first resolution and as a value for controlling a driving current, corresponding to a current zone having a brightness level less than the reference, to have second resolution higher than the first resolution.

That is, resolution of the range in which brightness of a specific driving current is represented may be raised by the zoom control signal CZ.

A pulse width modulation (PWM) method of representing a brightness level of an LED channel as a level, that is, amplitude, of the column signal has been applied to the embodiments of FIGS. 1 to 13. That is, in the embodiments of FIGS. 1 to 13, the driving current of the LED channel is controlled by amplitude of the column signal, that is, a pulse.

In the case of the PAM method, a brightness level of the column signal may be represented as discrete pulse amplitude corresponding to two to the power of n (n is a natural number). That is, if the brightness level is divided into eight, the column signal may have discrete pulse amplitude corresponding to two to the power of 3.

Figure 14:
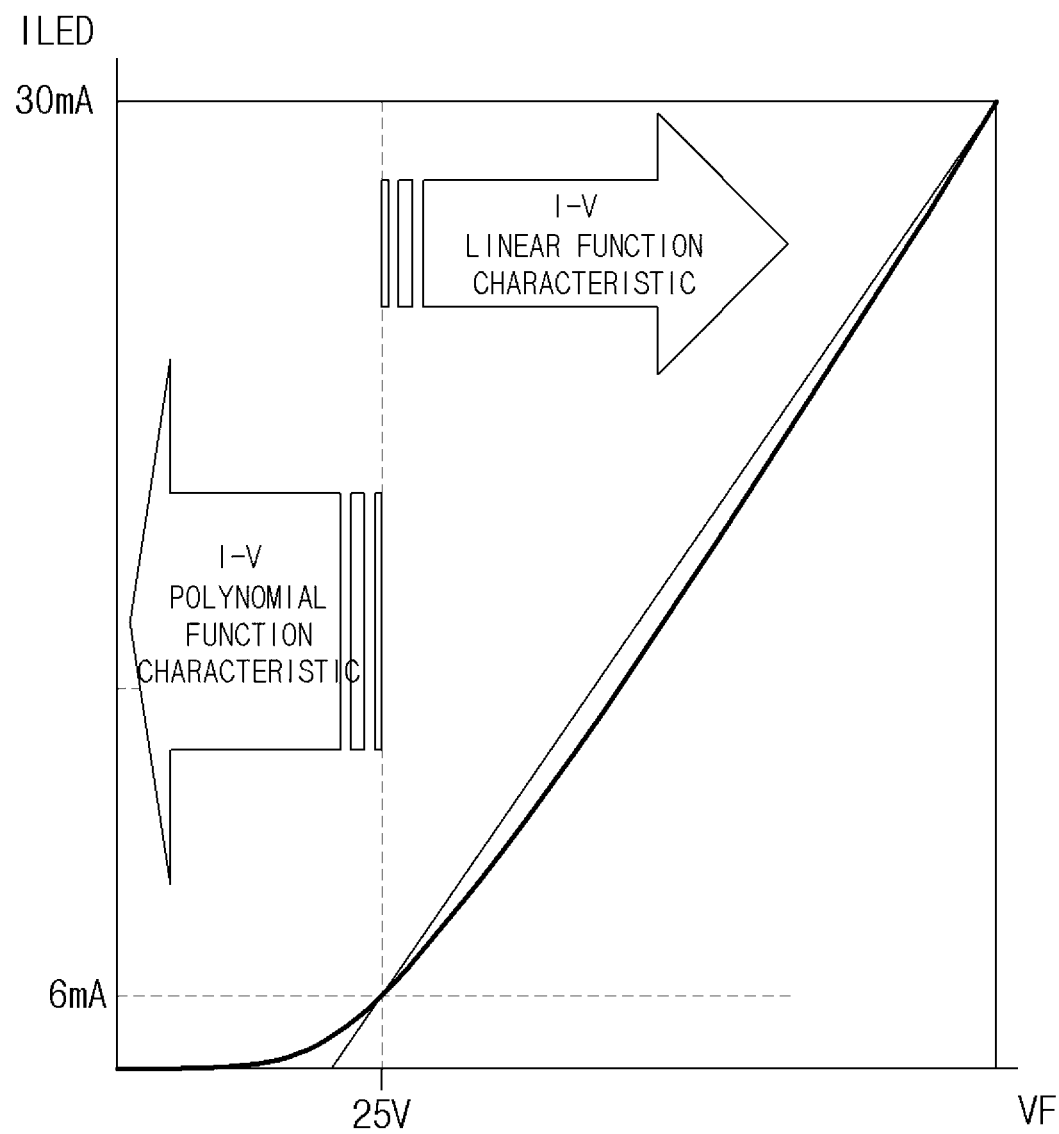
FIG. 14 is a current-voltage characteristic graph of an LED channel according to brightness.

A driving current to driving voltage of an LED channel may have a change characteristic depending on a change in brightness as in the graph of FIG. 14. In FIG. 14, the driving current is represented as ILED, and a driving voltage of the LED channel is represented as VF.

A change characteristic of the driving current to the driving voltage according to a change in brightness of the LED channel is different based on a specific brightness level.

Specifically, referring to FIG. 14, assuming that a driving current and a driving voltage corresponding to a brightness level of 10% are 6 mA and 25 V, respectively, based on a brightness level of 100%, that is, maximum brightness, a change characteristic of a driving current to a driving voltage according to a change in brightness is different based on the brightness level of 10%. For example, a change characteristic of a driving current to a driving voltage in a zone corresponding to brightness having a brightness level of 10% or more set as reference brightness has a linear function change characteristic. A change characteristic of a driving current to a driving voltage in a zone corresponding to brightness less than the brightness level of 10% set as the reference brightness has a polynomial function change characteristic. The linear function change characteristic means that the driving current and the driving voltage are changed in approximation to a change in the linear function. The polynomial function change characteristic means that the driving current and the driving voltage are changed in approximation to a change represented as a complex of polynomial functions.

In the case of the PAM method, brightness of an LED channel is linearly changed to approach the linear function characteristic in response to a change in the level of a driving voltage. Therefore, a brightness range of LED channels having a brightness level of 10% or more may be properly represented by a driving voltage having a level changed by the PAM method. However, there is a difficulty in representing a brightness range of LED channels having a brightness level less than 10% by using the PAM method due to the polynomial function change characteristic of a driving current and a driving voltage.

In this case, the brightness range of LED channels having the brightness level less than 10% may be implemented by applying the PWM method of controlling a driving current based on the pulse width of a column signal. In the case of the PWM method, a column signal may be provided to have a pulse width, that is, a duty varying in response to brightness. In this case, amplitude of the column signal is constantly fixed to have a level corresponding to brightness of 100%, for example.

In the case of the PWM method, a driving voltage is controlled by the duty of a column signal. As a result, a change characteristic of a driving current and a driving voltage having a brightness range in which the brightness level is less than 10% can be represented.

Hereinafter, a brightness range in which a brightness level is less than 10% is called a first brightness range, and a brightness range in which a brightness level is 10% or more is called a second brightness range, for convenience of description. In this case, the brightness level of 10% may be understood as reference brightness.

An embodiment of the present disclosure may be configured to control a driving current by using the PWM method with respect to the first brightness range and to control a driving current by using the PAM method with respect to the second brightness range. In contrast, an embodiment of the present disclosure may be configured to control a driving current by using the PWM method with respect to the entire brightness range.

As described above, in order to apply the PWM method to some of or the entire brightness range, one frame period may be divided into a plurality of subframes that are time-divided. The plurality of subframe is sequentially represented for one frame period. As a result, brightness of each LED channel in one frame period may be represented as overlapped brightness of each LED channel in subframe periods.

Therefore, in the case of the PWM method, brightness of an LED channel is determined as a ratio based on the number of subframes turned on in one frame period.

Figure 15:
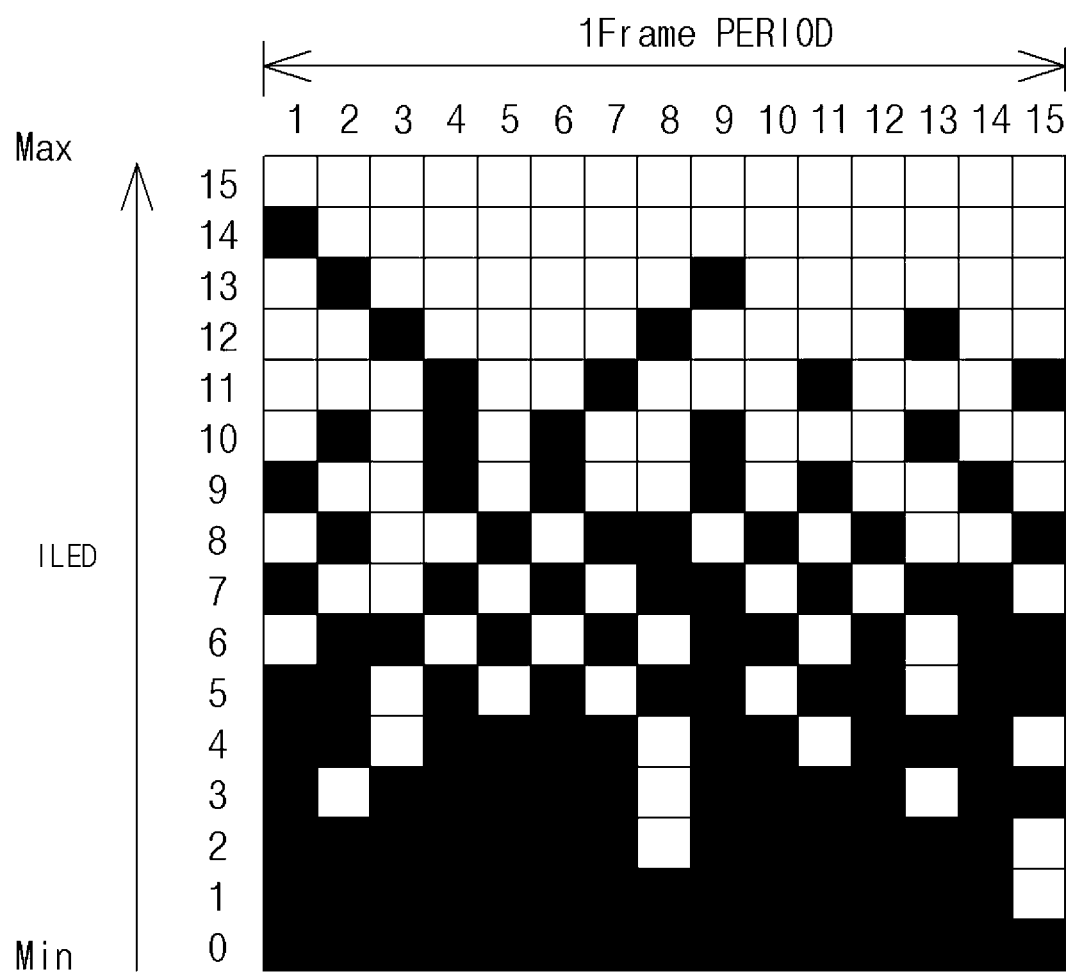
FIG. 15 is a diagram for describing a method of driving a column signal for controlling brightness by using a pulse width modulation (PWM) method.

Referring to FIG. 15, one frame period may be divided into fifteen subframe periods. A brightness range of LED channels may be divided into sixteen levels and controlled using the PWM method. In FIG. 15, a subframe indicated as a blank box indicates that the LED channel is turned on. A subframe indicated as a solid box indicates that the LED channel is turned off.

For example, a column signal corresponding to brightness "0" that represents the lowest brightness has a value that turns off all the 15 subframe periods. In this case, the column signal may maintain low values, for example, in all the 15 subframe periods. Furthermore, a column signal corresponding to brightness "15" that represents the highest brightness has a value that turns on all the 15 subframe periods. In this case, the column signal may include a pulse having a high level, for example, in all the subframe periods. Furthermore, a column signal corresponding to brightness "3" have a value that turns on second, eight and thirteenth subframe periods. In this case, the column signal may include pulses each having a high level in the second, eight and thirteenth subframe periods.

Therefore, with respect to one frame, the column signal for one LED channel may be distributed into subframes time-divided from one frame period and provided to columns as in FIG. 15. Furthermore, with respect to horizontal periods of the subframes, the column signals may be sequentially provided to the columns in a horizontal period unit.

In response to the column signals, low signals may also be distributed into subframes for one frame period and provided to the rows of LED channels, and may be sequentially provided to the rows in a horizontal period unit with respect to the subframes.

The subframe serves to represent the emission for the same area as a frame. The frame may be understood to have desired brightness for each LED channel by overlapping subframes that are time-divided and sequentially represented.

Figure 16:
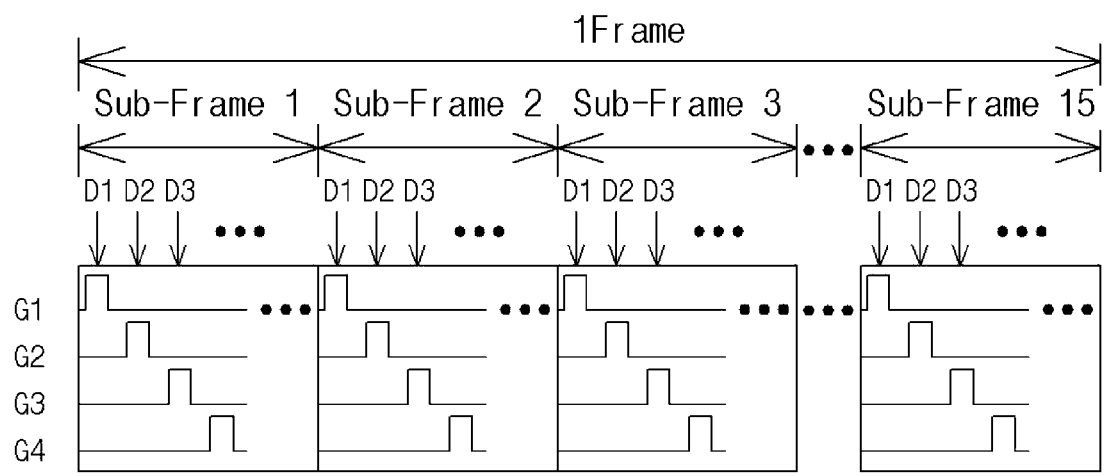
FIG. 16 is a waveform diagram for describing an operation of the current control integrated circuit according to the PWM method.

For example, if fifteen subframes that are time-divided are included in one frame period, each subframe period corresponds to "(one frame period)/15." Furthermore, if one frame is represented by sixteen columns and four rows, column signals and row signals are provided to the sixteen columns and the four rows every fifteen subframes as in FIG. 16. That is, the fifteen subframes are represented in one frame period, each of the subframes is represented by column signals sequentially provided to the sixteen columns and row signals sequentially provided to the four rows, and each LED channel of the frame may have brightness according to an overlap representation of the subframes.

If the LED channels of one frame are controlled by the PWM method, it is preferred that the remaining brightness except the turn-off and turn-on of all the subframes within the one frame of an image achieves brightness of the one frame through subframes turned on or off and distributed each other as much as possible.

If the PWM method is applied to the entire brightness range, the gamma voltage provider 30 provides a gamma voltage having a preset level. The gamma voltage may be set to have a level for representing the highest brightness, for example. Furthermore, the row driver 20 may be configured to sequentially provide, for each subframe, row signals, each having a pulse width preset for each subframe.

Furthermore, the column driver 10 may provide columns with column signals for representing brightness in accordance with external data. The column signals may be distributively provided to each have a low or high pulse for each subframe. The column signals may be provided to the columns in a way to have a level corresponding to a gamma voltage for each horizontal period for a subframe period.

Through the above construction, for example, the current control integrated circuit T11 may receive a column signal and row signals according to the PWM method, may generate sampling voltages by sequentially sampling the column signal for each horizontal period of a subframe by using the row signals, and may control the emission of LED channels of each control unit and the maintenance of brightness of the LED channels, by using the sampling voltages. If the PWM method is applied to some of a brightness range, more specifically, if the PWM method is applied to the first brightness range and the PAM method is applied to the second brightness range, the gamma voltage provider 30 may be configured to provide gamma voltages for various types of brightness. The row driver 20 may be configured to sequentially provide, for each subframe, rows with row signals, each having a pulse width preset for each subframe.

Furthermore, the column driver 10 may provide columns with column signals for representing brightness in accordance with external data. The column signals may be distributively provided for each subframe. The column signals may be provided to the columns in a way to have a level corresponding to a gamma voltage for each horizontal period for a subframe period.

At this time, with respect to the first brightness range, the column driver 10 may provide the columns with the column signals for representing brightness. The column signals may be distributively provided for each subframe by using the PWM method, for example, in a way to each have a level for representing the highest brightness. Furthermore, with respect to the second brightness range, the column driver 10 may distributively provide the column signals for each subframe so that the column signals each have a level corresponding to a gamma voltage corresponding to brightness for the emission of each LED channel by using the PAM method.

The column driver 10 may distributively provide column signals in a way to each have a low or high pulse for each subframe with respect to the first brightness range, and may distributively provide column signals, each having a level corresponding to a gamma voltage corresponding to data, for each subframe in a pulse form with respect to the second brightness range.

Through the above construction, for example, the current control integrated circuit T11 may receive a column signal and row signals provided by the PWM method or the PAM method, may generate sampling voltages by sequentially sampling the column signal for each subframe or each horizontal period of one frame by using row signals, and may control the emission of LED channels of each control unit and the maintenance of brightness of the LED channels, by using the sampling voltages.

As described above, the present disclosure can control a driving current of an LED channel so that the emission thereof is maintained in a frame unit by using a sampling voltage obtained by sampling a column signal. As a result, the flicker in the backlight apparatus for a display can be reduced or prevented.

Furthermore, according to the present disclosure, convenience of a design and fabrication for control of the driving currents of LED channels in the backlight panel can be guaranteed because the current control integrated circuit is configured for each control unit including a plurality of LED channels.

Furthermore, according to the present disclosure, LED channels may be controlled to emit light with uniform brightness. An electrical short or electrical opening of an LED channel can be periodically detected.

Furthermore, according to the present disclosure, there can be provided the backlight apparatus for a display, which can perform active dimming control, and the current control integrated circuit thereof.

Furthermore, according to the present disclosure, the amount of light for an LCD panel, can be controlled through a multi-function, such as the PAM method, the PWM method, and a combination of the PAM and PWM methods. Accordingly, high reliability can be secured.

What is claimed is:

1. A backlight apparatus for a display comprising:
    a backlight panel comprising light-emitting diode (LED) channels having a matrix structure forming a frame and divided into a plurality of control units;
    a column driver configured to distributively provide a column signal for each of subframes time-divided from one frame period with respect to each of the LED channels and to provide the column signals to columns of the frame in a horizontal period unit of the subframe, wherein the column signal is generated to have brightness determined by a number of subframes, the subframes being are included in the one frame period and turned on;
    a row driver configured to provide row signals to rows of the frame for each subframe and to sequentially provide the row signals in the horizontal period for each subframe; and
    current control integrated circuits disposed in the backlight panel to correspond to the control units, respectively, and each configured to receive the column signal and the row signals corresponding to the LED channels of the control unit and to control emission of the LED channels of the control unit, wherein
    each of the current control integrated circuits is configured to:
        generate sampling voltages by sequentially sampling the column signal provided in the horizontal period unit by using the row signals for each subframe, and
        control an emission of the LED channels and maintain a brightness of the LED channels of the control unit by using the sampling voltages,
    the current control integrated circuit further comprises a feedback input configured to provide a feedback signal and a feedback signal provider circuitry connected to the feedback input, row input stages to which the row signals are input, respectively, and driving current controllers configured to receive the column signal in common and connected to the row input stages, respectively,
    each of the driving current controllers comprises a channel detector circuitry configured to provide a first detection signal by detecting a voltage between the control stage and a ground.

2. The backlight apparatus of claim 1, further comprising a gamma voltage source configured to provide a gamma voltage having a preset level,
    wherein the row driver provides the row signals so that each of the row signals has a preset pulse width,
    the column driver provides each of the LED channels with the column signal, which has a level corresponding to the gamma voltage in order to represent brightness corresponding to external data and which is distributed for each subframe, and
    the LED channels are controlled to achieve brightness of one frame such that subframes turned on or off within the one frame are distributed with respect to remaining brightness except a turn-on and off of all the subframes.

3. The backlight apparatus of claim 1, wherein:
    each of the current control integrated circuits comprises a column input stage to which the column signal is input, the row input stages to which the row signals are input, respectively, the driving current controllers configured to receive the column signal in common and connected to the row input stages, respectively, and control stages connected to the driving current controllers, respectively, and
    each of the driving current controllers generates the sampling voltage by sampling the column signal corresponding to the horizontal period for each subframe by using the row signal and controls the driving current of the LED channel connected to the control stage by using the sampling voltage.

4. The backlight apparatus of claim 3, wherein each of the driving current controllers controls the driving current between the ground and the LED channel corresponding to a low side of the LED channel by using the sampling voltage.

5. The backlight apparatus of claim 3, wherein:
the current control integrated circuit further comprises a buffer configured to receive the column signal through the column input stage, and
the buffer provides the column signal to the driving current controllers in common.

6. The backlight apparatus of claim 3, wherein:
the feedback signal provider circuitry controls the feedback signal of the feedback input in response to each of the first detection signals of the driving current controllers.

7. The backlight apparatus of claim 3, wherein:
the current control integrated circuit further comprises a monitor input configured to provide a monitor signal and a monitor signal provider circuitry connected to the monitor stage,
each of the driving current controllers comprises the channel detector circuitry configured to provide a second detection signal by detecting a voltage between the control stage and a ground, and
the monitor signal provider circuitry receives the second detection signals and row signals of the driving current controllers and controls the monitor signal of the monitor input when the row signal and second detection signal of the at least one driving current controller are activated.

8. The backlight apparatus of claim 7, wherein:
the current control integrated circuit further comprises a temperature detector configured to provide a temperature detection signal obtained by sensing a temperature, and
the monitor signal provider circuitry controls the monitor signal of the monitor input in response to the temperature detection signal.

9. The backlight apparatus of claim 3, wherein:
the current control integrated circuit further comprises a feedback input configured to provide a feedback signal, a monitor input configured to provide a monitor signal, a feedback signal provider circuitry connected to the feedback input, and a monitor signal provider circuitry connected to the monitor input,
each of the driving current controllers comprises the channel detector circuitry configured to provide a first detection signal being a result of determining whether a level of a voltage between the control stage and the ground is equal to or lower than a first level, and a second detection signal being a result of determining whether the level of the voltage is equal to or lower than a second level lower than the first level,
the feedback signal provider circuitry controls the feedback signal of the feedback input in response to each of the first detection signals of the driving current controllers, and
the monitor signal provider circuitry receives the second detection signals and row signals of the driving current controllers and controls the monitor signal of the monitor input when the row signal and second detection signal of the at least one driving current controller are activated.

10. The backlight apparatus of claim 3, wherein the driving current controller comprises:
a holding circuit configured to generate the sampling voltage by sampling the column signal corresponding to the horizontal period of the subframe by using the row signal and to maintain the sampling voltage; and
a channel current controller circuitry configured to control a driving current for the emission of the LED channel connected to the control stage by using the sampling voltage so that the driving current is proportional to the sampling voltage.

11. The backlight apparatus of claim 10, wherein:
the current control integrated circuit comprises a zoom input configured to receive a zoom control signal, and
the channel current controller circuitry controls resolution of the driving current, controlled by the sampling voltage, in response to the zoom control signal.

12. The backlight apparatus of claim 3, wherein the driving current controller comprises:
a conversion circuitry configured to generate the sampling voltage by sampling the column signal corresponding to the horizontal period of the subframe by using the row signal, maintain the sampling voltage, and provide a control current proportional to the sampling voltage; and
a channel current controller circuitry configured to control the driving current for the emission of the LED channel connected to the control stage so that the driving current has an amount of current proportional to the control current.

13. The backlight apparatus of claim 12, wherein:
the current control integrated circuit comprises a zoom input configured to receive a zoom control signal, and
the conversion circuitry controls resolution of the driving current in response to the zoom control signal.

14. The backlight apparatus of claim 12, wherein:
the current control integrated circuit comprises a zoom input configured to receive a zoom control signal, and
the channel current controller circuitry controls resolution of the driving current in response to the zoom control signal.

15. The backlight apparatus of claim 1, wherein the control unit comprises a given number of LED channels contiguously disposed in an identical column.

16. A backlight apparatus for a display comprising:
a backlight panel comprising light-emitting diode (LED) channels having a matrix structure forming a frame and divided into a plurality of control units;
a column driver configured to distributively provide a column signal for each of subframes time-divided from one frame period with respect to each of the LED channels and to provide column signals to columns of the frame in a horizontal period unit of the subframe, wherein brightness ranges represented by the column signal are divided into a first brightness range and a second brightness range, the column signal having the first brightness range is generated to have brightness determined by a number of subframes, the subframes being included in the one frame period and turned on, and the column signal having the second brightness range is generated to represent brightness depending on amplitude;
a row driver configured to provide row signals to rows of the frame for each subframe and to sequentially provide the row signals in the horizontal period for each subframe; and
current control integrated circuits disposed in the backlight panel to correspond to the control units, respectively, and each configured to receive the column signal and the row signals corresponding to the LED channels of the control unit and to control emission of the LED channels of the control unit, wherein each of the current control integrated circuits generates sampling voltages by sequentially sampling the column signal provided in the horizontal period unit by using the row signals for each subframe, and controls an emission of LED channels of each control unit and maintains a brightness of the LED channels by using the sampling voltages and wherein each of the current control integrated circuits comprises a column input stage to which the column signal is input, row input stages to which the row signals are input, respectively, driving current controllers configured to receive the column signal in common and connected to the row input stages, respectively, and control stages connected to the driving current controllers, respectively, and wherein each of the driving current controllers generates the sampling voltage by sampling the column signal corresponding to the horizontal period of the subframe by using the row signals.

17. The backlight apparatus of claim 16, further comprising a gamma voltage source configured to provide a gamma voltage, wherein the row driver provides the row signals so that each of the row signals has a preset pulse width, the column driver provides each of the LED channels with the column signal, which has a level corresponding to the gamma voltage in order to represent brightness corresponding to external data and which is distributed for each subframe, wherein with respect to the first brightness range, the column signal is generated to have brightness having a level corresponding to a preset gamma voltage and determined by a number of subframes, the subframes being included in the one frame period and turned on, and with respect to the second brightness range, the column signal is generated to have a level corresponding to the gamma voltage corresponding to brightness of the data and to be distributed to subframes included in the one frame period, and the LED channels are controlled to achieve brightness of one frame such that subframes turned on or off within the one frame are distributed with respect to remaining brightness except a turn-on and off of all the subframes.

18. The backlight apparatus of claim 17, wherein:
the first brightness range has brightness lower than preset reference brightness, and
the second brightness range has brightness equal to or higher than the reference brightness.

19. The backlight apparatus of claim 17, wherein:
each of the driving current controllers further controls the driving current of the LED channel connected to the control stage by using the sampling voltage.

20. The backlight apparatus of claim 19, wherein each of the driving current controllers controls the driving current between a ground and the LED channel corresponding to a low side of the LED channel by using the sampling voltage.

21. The backlight apparatus of claim 19, wherein:
the current control integrated circuit further comprises a buffer configured to receive the column signal through the column input stage, and
the buffer provides the column signal to the driving current controllers in common.

22. The backlight apparatus of claim 19, wherein:
the current control integrated circuit further comprises a feedback input configured to provide a feedback signal and a feedback signal provider circuitry connected to the feedback input, each of the driving current controllers comprises a channel detector circuitry configured to provide a first detection signal by detecting a voltage between the control stage and a ground, and the feedback signal provider circuitry controls the feedback signal of the feedback input in response to each of the first detection signals of the driving current controllers.

23. The backlight apparatus of claim 19, wherein:
the current control integrated circuit further comprises a monitor input configured to provide a monitor signal and a monitor signal provider circuitry connected to the monitor input, each of the driving current controllers comprises a channel detector circuitry configured to provide a second detection signal by detecting a voltage between the control stage and a ground, and the monitor signal provider circuitry receives the second detection signals and row signals of the driving current controllers and controls the monitor signal of the monitor input when the row signal and second detection signal of the at least one driving current controller are activated.

24. The backlight apparatus of claim 23, wherein:
the current control integrated circuit further comprises a temperature detector configured to provide a temperature detection signal obtained by sensing a temperature, and the monitor signal provider circuitry controls the monitor signal of the monitor input in response to the temperature detection signal.

25. The backlight apparatus of claim 19, wherein:
the current control integrated circuit further comprises a feedback input configured to provide a feedback signal, a monitor input configured to provide a monitor signal, a feedback signal provider circuitry connected to the feedback input, and a monitor signal provider circuitry connected to the monitor input, each of the driving current controllers comprises a channel detector circuitry configured to provide a first detection signal being a result of determining whether a level of a voltage between the control stage and a ground is equal to or lower than a first level, and a second detection signal being a result of determining whether the level of the voltage is equal to or lower than a second level lower than the first level, the feedback signal provider circuitry controls the feedback signal of the feedback input in response to each of the first detection signals of the driving current controllers, and the monitor signal provider circuitry receives the second detection signals and row signals of the driving current controllers and controls the monitor signal of the monitor input when the row signal and second detection signal of the at least one driving current controller are activated.

26. The backlight apparatus of claim 19, wherein the driving current controller comprises:
a holding circuit configured to generate the sampling voltage by sampling the column signal corresponding to the horizontal period of the subframe by using the row signal and to maintain the sampling voltage; and a channel current controller circuitry configured to control a driving current for the emission of the LED channel connected to the control stage by using the sampling voltage so that the driving current is proportional to the sampling voltage.

27. The backlight apparatus of claim 26, wherein:

the current control integrated circuit comprises a zoom input configured to receive a zoom control signal, and the channel current controller circuitry controls resolution of the driving current, controlled by the sampling voltage, in response to the zoom control signal.

28. The backlight apparatus of claim 19, wherein the driving current controller comprises:

a conversion circuitry configured to generate the sampling voltage by sampling the column signal corresponding to the horizontal period of the subframe by using the row signal, maintain the sampling voltage, and provide a control current proportional to the sampling voltage; and a channel current controller circuitry configured to control the driving current for the emission of the LED channel connected to the control stage so that the driving current has an amount of current proportional to the control current.

29. The backlight apparatus of claim 28, wherein:

the current control integrated circuit comprises a zoom input configured to receive a zoom control signal, and the conversion circuitry controls resolution of the driving current in response to the zoom control signal.

30. The backlight apparatus of claim 28, wherein:

the current control integrated circuit comprises a zoom input configured to receive a zoom control signal, and the channel current controller circuitry controls resolution of the driving current in response to the zoom control signal.

31. The backlight apparatus of claim 16, wherein the control unit comprises a given number of the LED channels contiguously disposed in an identical column.

\* \* \* \* \*